United States Patent [19]

Sugiura et al.

[11] Patent Number: 5,189,523

[45] Date of Patent: Feb. 23, 1993

[54] IMAGE PROCESSING APPARATUS

[75] Inventors: Takashi Sugiura, Tokyo; Nao Nagashima; Shunichi Abe, both of Yokohama, all of Japan

[73] Assignee: Canon Kabushiki Kaisha, Tokyo, Japan

[21] Appl. No.: 618,398

[22] Filed: Nov. 27, 1990

[30] Foreign Application Priority Data

| Nov. 27, 1989 | [JP] | Japan | 1-304848 |
| Dec. 29, 1989 | [JP] | Japan | 1-341987 |
| Jan. 31, 1990 | [JP] | Japan | 2-019286 |

[51] Int. Cl.$^5$ .................. H04N 1/29; H04N 1/38; H04N 1/387; H04N 1/46

[52] U.S. Cl. .................. 358/300; 358/453; 358/462; 358/464; 358/75; 358/80

[58] Field of Search ............. 358/300, 296, 75, 80, 358/451, 453, 452, 455, 461, 462, 464

[56] References Cited

U.S. PATENT DOCUMENTS

| 4,695,895 | 9/1987 | Nagashima . | |
| 4,709,274 | 11/1987 | Tanioka | 358/455 |
| 4,713,684 | 12/1987 | Kawamura et al. . | |
| 4,719,516 | 1/1988 | Nagashima . | |
| 4,807,044 | 2/1989 | Kikuchi et al. . | |
| 4,837,635 | 6/1989 | Santos | 358/451 |
| 4,870,500 | 9/1989 | Nagashima . | |
| 4,887,151 | 12/1989 | Wataya | 358/75 |
| 4,888,636 | 12/1989 | Abe . | |
| 4,926,251 | 5/1990 | Sekizawa | 358/80 |
| 4,953,012 | 8/1990 | Abe | 358/462 |
| 4,958,219 | 9/1990 | Kadowaki . | |
| 4,974,071 | 11/1990 | Maeda | 358/75 |

Primary Examiner—Benjamin R. Fuller
Assistant Examiner—Scott A. Rogers
Attorney, Agent, or Firm—Fitzpatrick, Cella, Harper & Scinto

[57] ABSTRACT

An image processing apparatus suitable for use in a copying machine or a facsimile apparatus includes an input circuit for inputting an image signal, an image discrimination circuit for discriminating a characteristic of the input image signal and providing a discrimination signal representing that characteristic, and a memory for storing the discrimination signal. A processing circuit then processes a reentered image signal input by the input circuit in accordance with the discrimination signal stored in the memory to reproduce an image.

17 Claims, 21 Drawing Sheets

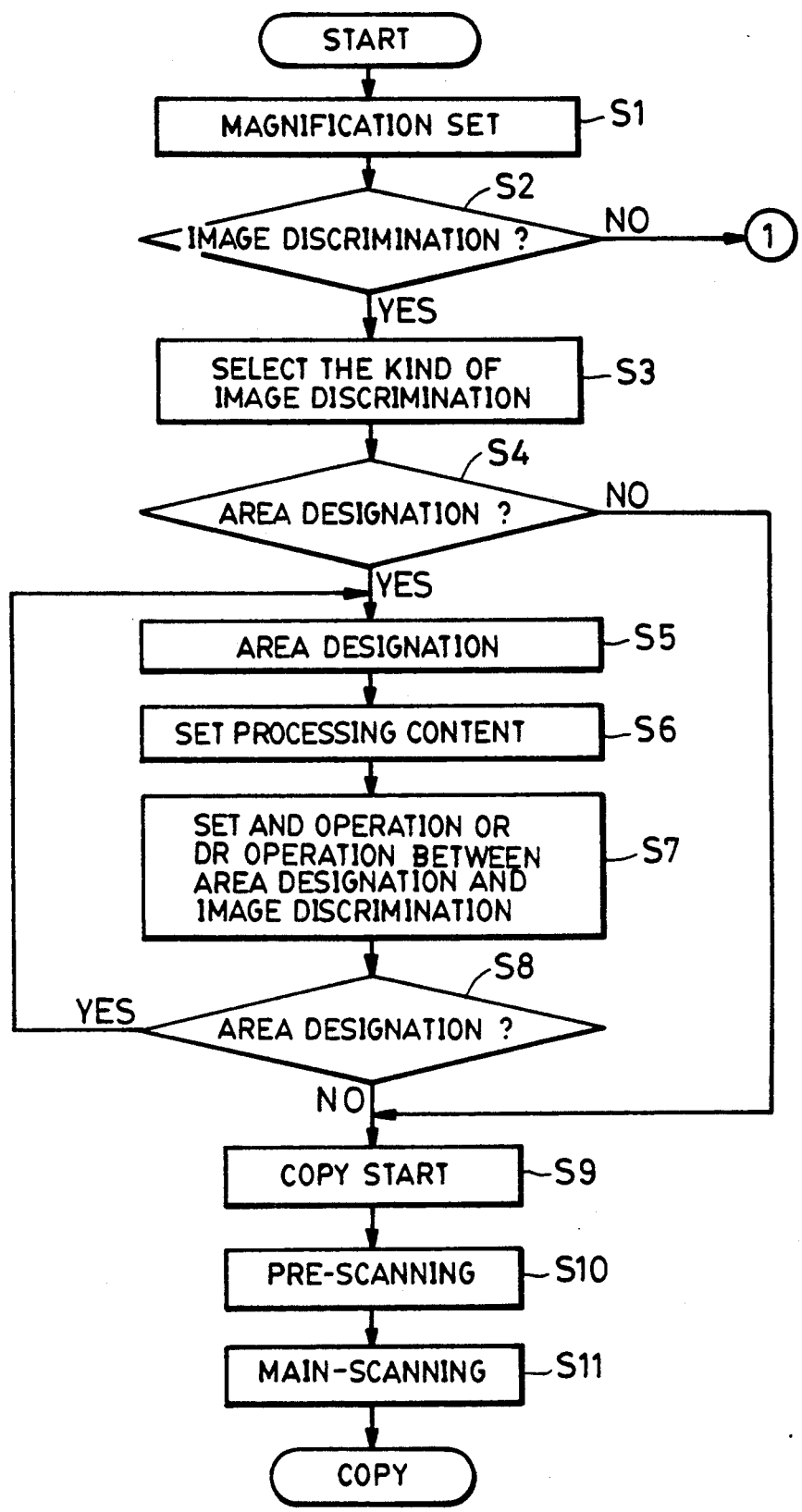
FIG. IIA

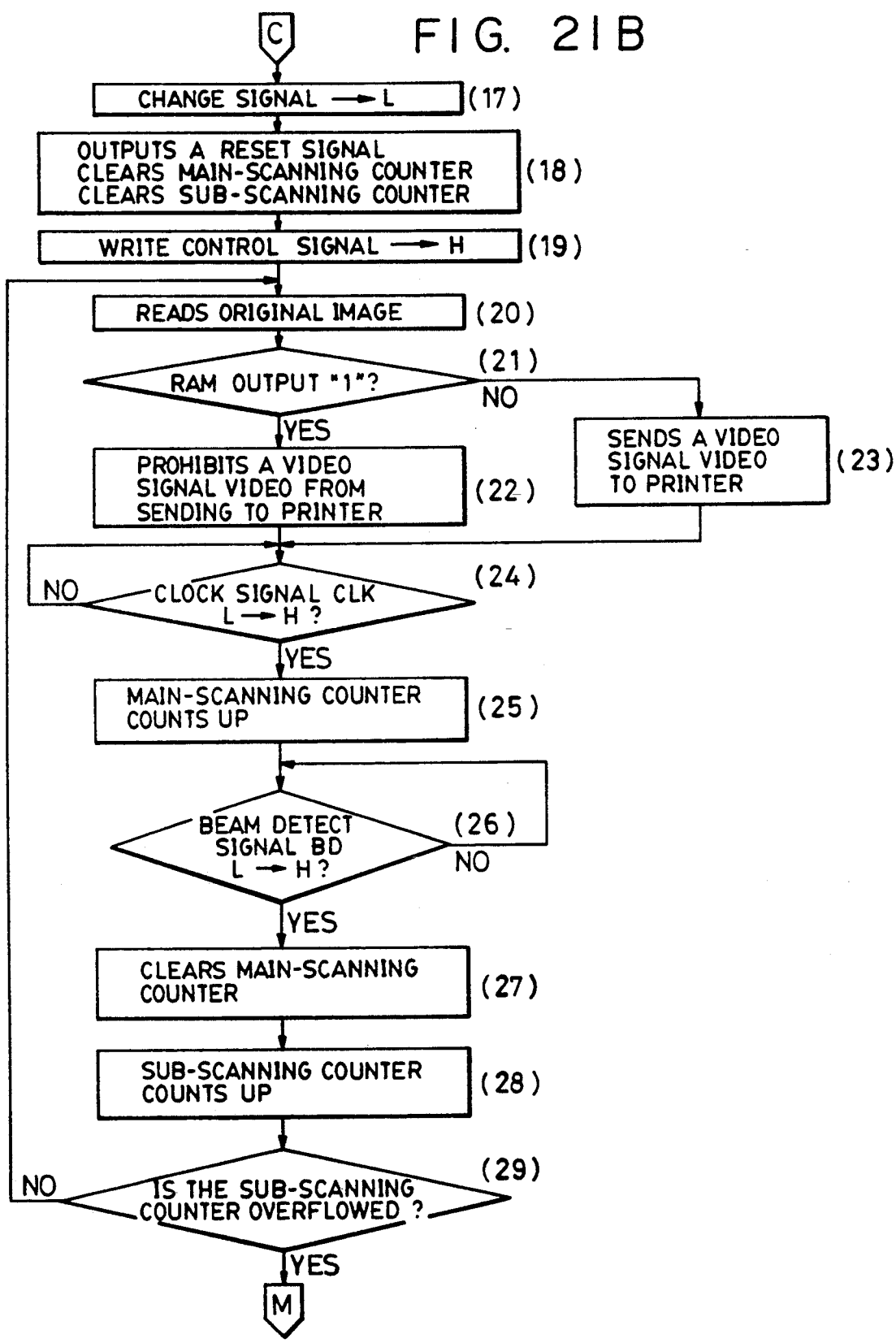

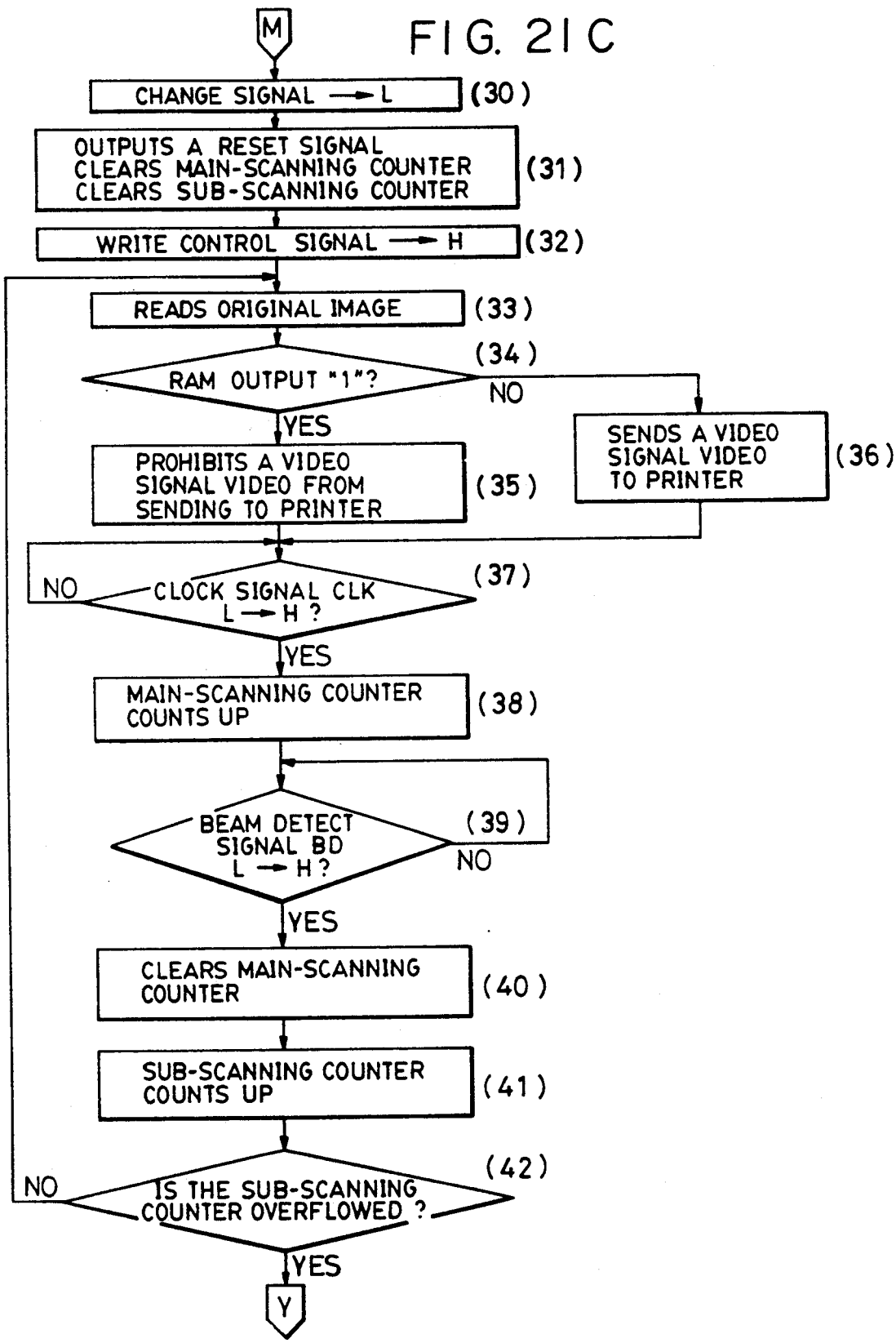

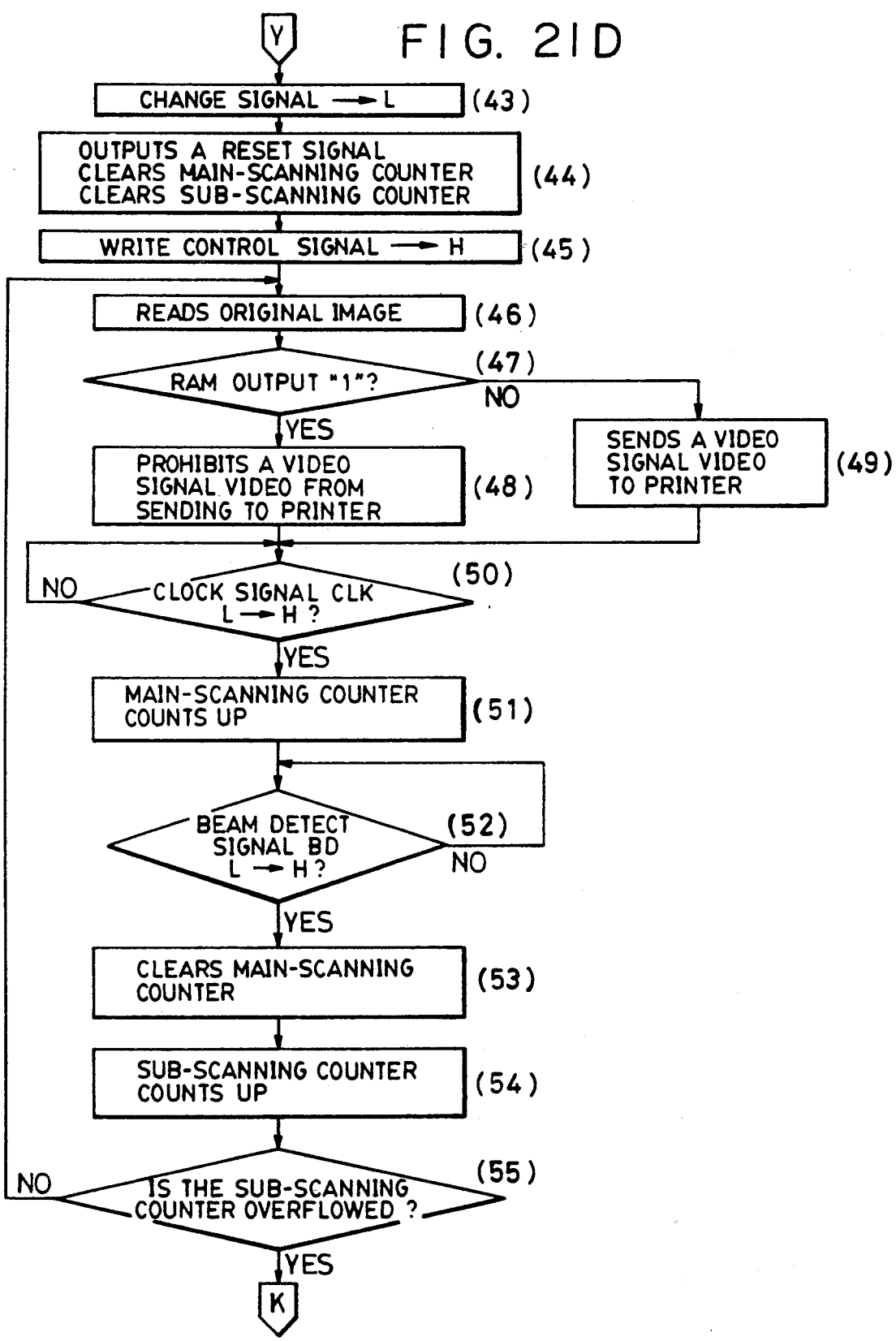

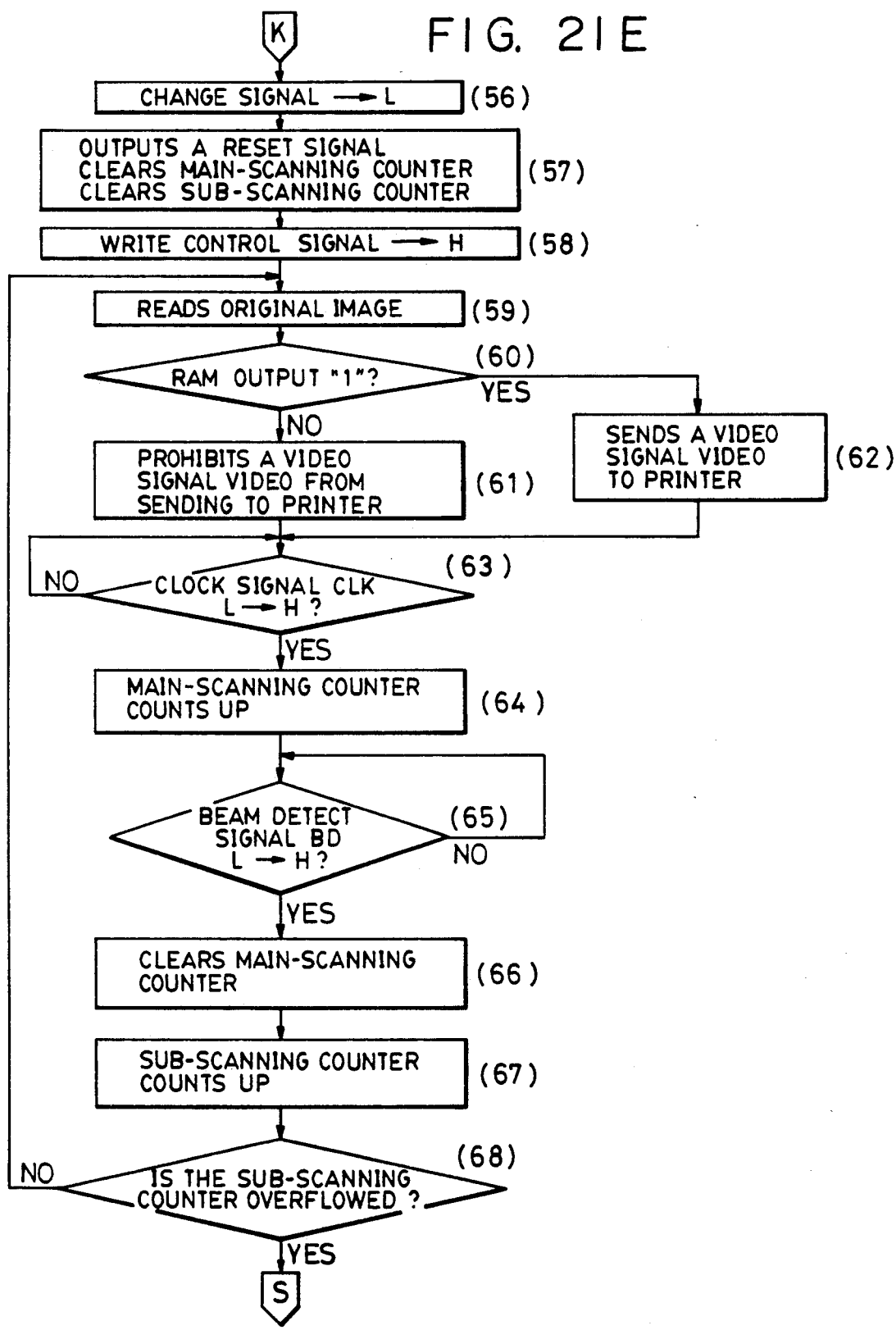

IMAGE PROCESSING APPARATUS

BACKGROUND OF THE INVENTION

1. Field of the Invention

This invention relates to an image processing apparatus, and more specifically to an image processing apparatus which can discriminate a characteristic of the image, such as characters versus halftone.

2. Related Background

A known image processing apparatus is structured in such a way that it performs image discrimination and copying with the same document scanning.

FIG. 12 is a schematic block diagram for explaining operation of the known image processing apparatus. As shown in FIG. 12, an image discrimination circuit 12-2 executes image discrimination, such as edge extracting, on image information input from a terminal (a). Circuit 12-2 generally must use a big area, for example, 10 pixels×10 pixels, for discriminating between a character region and a picture region precisely. In such case, the image signals are delayed for five (5) lines by the image discrimination circuit 12-2. Therefore, a delay circuit 12-1 is provided for delaying image signals input from terminal (a) for five lines in order to make an image processing circuit 12-3 process the image signals in program synchronism with the output of the discrimination circuit 12-2.

However, the above-described known image processing apparatus requires a large-scale delay circuit because image discrimination has to be executed prior to image processing. When the apparatus is a color copying apparatus, the image signals comprise red, green, and blue multi-level image signals. This has resulted in the defect that an especially large-scale delay circuit is required to execute image discrimination on these three multi-level image signals.

A known color copier (or other image input/output apparatus) performs scanning of an original four times to make one copy from an original. For example, the apparatus outputs a yellow component signal (Y) based on each of the blue component signal (B), the green component signal (G), and the red component signal (R), which are obtained by means of the first original scanning, and reproduces a yellow toner image. The apparatus also outputs a magenta component signal (M), a cyan component signal (C), and a black component signal (BK), each based on each of the color component signals (B), (G) and (R), which are all read again during each second, third, and fourth original scannings, and reproduces magenta, cyan, and black toner images, respectively. These four toner images are superposed to form a full color image.

It is preferable to reproduce an edge portion of a black character with only black toner because doing so makes the reproduced image of the black character stand out. However, it is impossible to read precisely the same point on an original repeatedly in each of four consecutive original readings because of mechanical wear or vibrations. For example, in the case where approximately the same point on the original, from which only the blue component signal (B) is output at the first original scanning, is read four times, the blue, green, red component signals may be output with the same rate. This has resulted in the defect that what should be the reproduction of a black edge portion of the original is not only not completely black but also is blurred.

Further, in the case where an original reading scanning system is driven by a stepping motor, the revolution speed of the stepping motor is lowered for an enlargement copying operation, as a result of which further color blurring occurs because of motor vibration. This has resulted in the defect that the quality of the reproduced image is vitiated, and the reproduced image is deficient in the reproduction of vivid colors.

SUMMARY OF THE INVENTION

Accordingly, an object of the present invention is to provide an image processing apparatus that can overcome the problems described above.

Another object of the present invention is to provide an image processing apparatus that can provide, with a simple arrangement, a superior quality image.

Still another object of the present invention is to provide an image processing apparatus that permits reproduction of images with high quality.

It is still another object of the present invention to provide an image processing apparatus having a good cost performance.

It is still another object of the present invention to provide an image processing apparatus capable of efficient memory control.

It is still another object of the present invention to provide an image processing apparatus that can minimize the scale of the required hardware structure.

It is still another object of the present invention to provide an image processing apparatus that can save memory capacity.

It is a further object of the present invention to provide an image processing apparatus which can produce a fine color image.

It is a further object of the present invention to provide an image processing apparatus in which a certain color or portion in a color image can be satisfactorily reproduced.

In accordance with a preferred embodiment, the image processing apparatus of the present invention includes an input circuit for inputting an image signal. An image discrimination circuit discriminates a characteristic of the input image signal and provides a discrimination signal representing the characteristic of the image signal. A memory stores the discrimination signal. A processing circuit then processes a reentered image signal input via the input circuit in accordance with the discrimination signal stored in the memory, to reproduce an image.

In accordance with another aspect of the present invention, the image processing apparatus includes an input circuit for inputting an image signal. An image discrimination circuit discriminates a characteristic of the input image signal and provides a discrimination signal representing the characteristic of the image signal. A designation circuit designates an image area the characteristic of which is to be discriminated by the image discrimination circuit. A changing circuit then changes or selects the resolution of the discrimination signal in accordance with the image area designated by the designation circuit.

In accordance with still another aspect of the invention, the image processing apparatus includes an input circuit for inputting an image signal. An extraction circuit extracts a predetermined portion from the input image signal and provides an extraction signal. A memory stores the extraction signal. A processing circuit then processes a reentered image signal input via the input circuit in accordance with the extraction signal stored in the memory, to reproduce an image.

Other objects, features, and advantages of the invention will become apparent from the following detailed description of the preferred embodiments of the present invention and the accompanying drawings.

BRIEF DESCRIPTION OF THE DRAWINGS

FIG. 11A and FIG. 11B are flow charts showing a processing procedure according to the embodiment of FIG. 1;

FIG. 21A through 21E are flow charts for explaining an example of black edge area processing procedure of an image processing apparatus.

DETAILED DESCRIPTION OF THE PREFERRED EMBODIMENTS

The preferred embodiments of the present invention will be described in detail herein with reference to the accompanying drawings.

Embodiment 1

Figure 1:
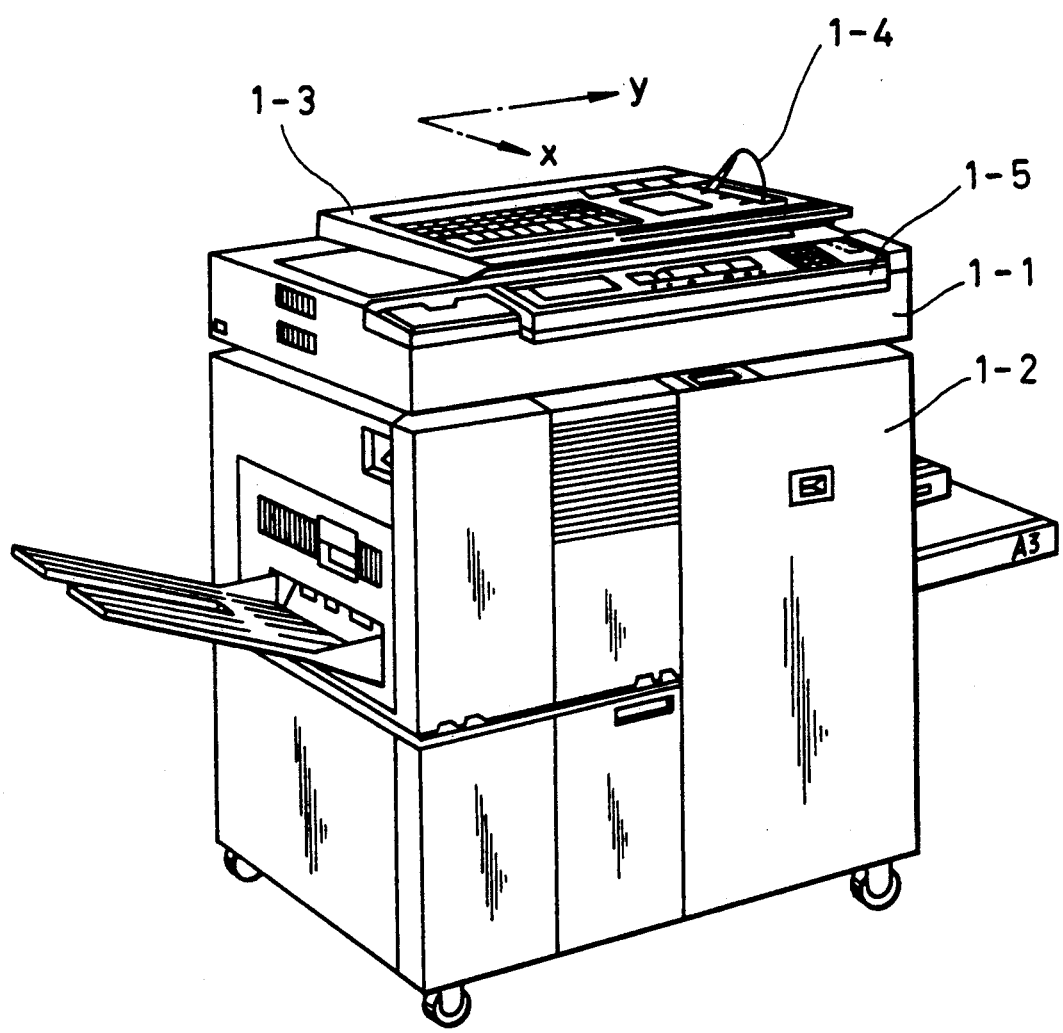
FIG. 1 is a schematic diagram showing an image processing apparatus according to a first preferred embodiment of the present invention.

FIG. 1 is a schematic perspective view of an image processing apparatus according to the first embodiment of the present invention. The apparatus shown in FIG. 1 includes a document reading unit/image processing unit 1-1. The document reading unit/image processing unit 1-1 comprises a line-shaped CCD sensor 2-3 (see FIG. 2) as an optical system photosensitive element for scanning an original, and an image processing unit described below. The line-shaped CCD sensor is a three-line color pickup element composed of red (R), green (G), and blue (B) optical filters.

An image output unit 1-2 composed of a full-color laser beam printer using an electrophotographic method is provided. A digitizer (area designating means) 1-3, which can be used also as an original cover, is provided for selecting a designated area on an original by means of a designation pen 1-4. An operation panel 1-5 is provided for designating the start of original reading, for selecting the number of copies to be made, and for selecting various kinds of editing, image processing, and so forth.

Figure 2:
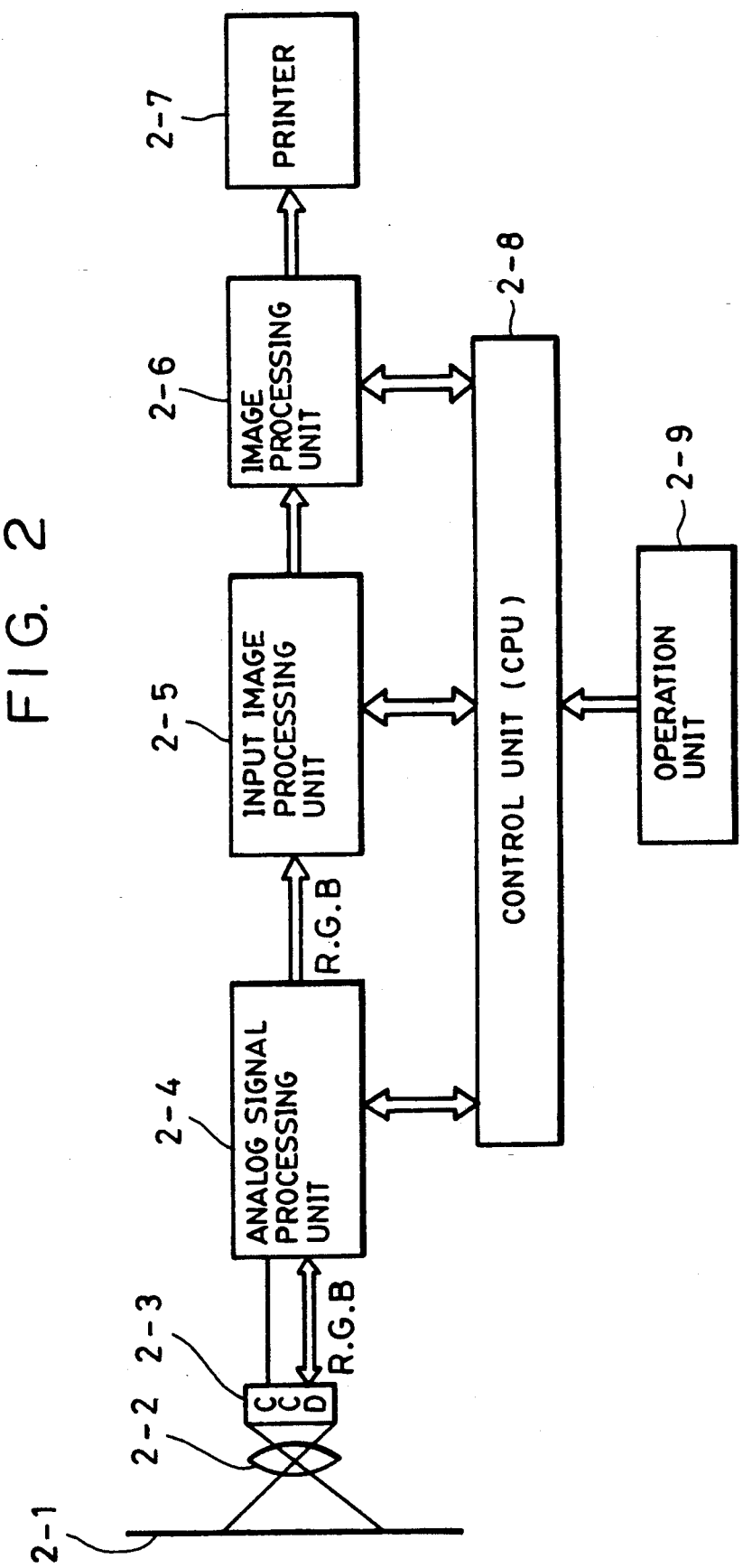
FIG. 2 is a schematic block diagram showing the structure of an image processing apparatus according to the embodiment of FIG. 1.

The structure of the document reading unit/image processing unit 1-1 will now be described with reference to FIG. 2;

In FIG. 2, numeral 2-1 denotes an original placed under the original cover 1-3. The unit shown in FIG. 2 includes an optical lens 2-2 for focusing an image of the original on the CCD sensor 2-3, which as mentioned above is structured with a three-line CCD having red (R), green (G), and blue (B) optical filters.

The number of photosensor sections making up one line of the CCD sensor are set is chosen so that the sensor can read the entire width in one direction of an original platen, e.g. a direction "X" (see FIG. 1). For example, in a case where the length of the original platen in the direction "X" is 30 cm and the resolution for reading an original is 16 pel per millimeter, the number of photosensor sections becomes more than 4800 (30×160=4800). The focusing sensor 2-3 scan the original in a direction other than "X" (for example, in a direction "Y") so as to read the original.

Original information is converted into analog electrical signals R, G, B by means of the CCD sensor 2-3, and the converted signals R, G, B are output to an analog signal processing unit 2-4. The analog signal processing unit 2-4 executes A/D (analog-to-digital) conversion for each color after performing a sample-and-hold operation, correction of dark level, and control of a dynamic range for each color, and outputs the converted signals R, G, B so processed to an input image processing unit 2-5. The input image processing unit 2-5 carries out shading correction, which corrects for variations in photosensitivity among the photosensor sections of the CCD sensor, for each color and outputs the corrected signals to an image processing unit 2-6.

The image processing unit 2-6 includes an image discrimination unit for extracting a character portion or a black character portion from an original, and a bit map memory for storing a discrimination result provided by an image discrimination unit (described below). The image processing unit 2-6 also includes a circuit for controlling an edge emphasis circuit according to the discrimination result, and a masking circuit, which corresponds to the output color characteristic of the laser beam printer (output device), for removing turbidity components due to the particular color filters of the CCD sensor. The image processing unit 2-6 further includes an editing circuit for shifting an image, trimming (framing), etc., and a log converting circuit for converting color information R, G, B into signals C, M, Y, and BK, which represent the amounts of cyan, magenta, yellow, and black toners used in the output device. Each density information signal C, M, Y, BK is output to a printing unit 2-7, which uses it to control application of the corresponding color of toner to a paper, e.g., using a full-color laser beam printer.

A control unit (CPU) 2-8 is provided for controlling various kinds of processing performed by the above-described processing units.

An operation unit 2-9, which includes the digitizer 1-3 and the operation panel 1-5 shown in FIG. 1, is also provided.

Detailed explanations of the image processing unit 2-6, which includes the image discrimination unit and which performing a process according to the discrimination result, will be given below with reference to FIG. 3.

Figure 3:
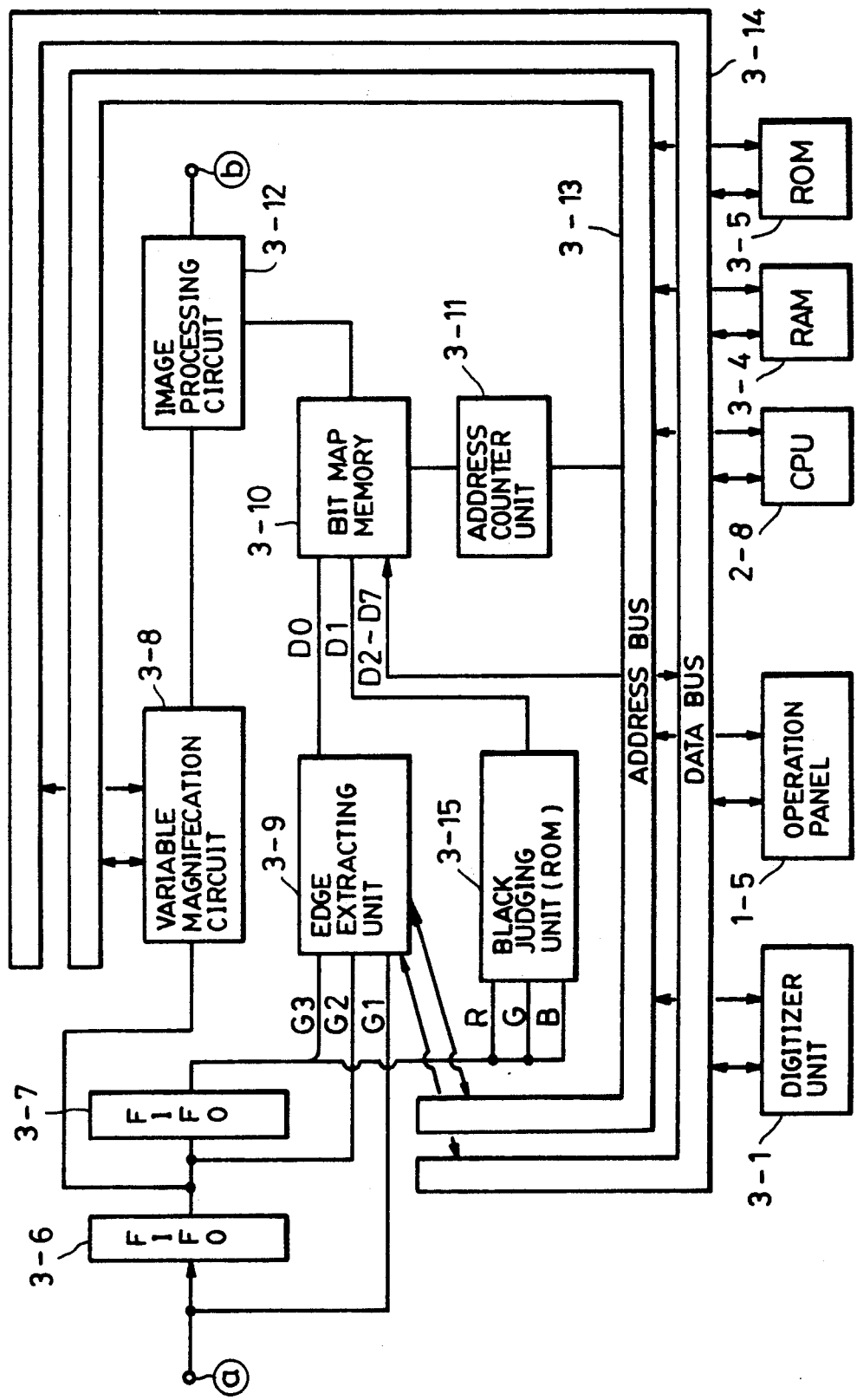
FIG. 3 is a block diagram showing details of an image processing unit according to the embodiment of FIG. 1.

The unit shown in FIG. 3 includes an image information input terminal (a) for inputting a multi-level image signal, and an output terminal (b) for outputting a multi-level image signal.

These multi-level image signals are each composed of three colored image signals R, G, B. However, for the sake of simplification, the routes for the image signal in each processing unit are described for only one color, or only one system. Additional explanations will be given only where necessary.

Image information input via the input terminal (a) is delayed by one line by each FIFO memory (hereinafter referred to simply as "FIFO") 3-6, 3-7.

An edge extracting unit 3-9 is provided for making a 3 pixel×3 pixel matrix. A spatial frequency filter, described below, executes a Laplacian operation on the matrix in order to extract any edge portion therein, such as a character. To reduce the scale of the edge extracting unit 3-9, it is structured in such a way that it can extract the edge portion by using only the green (G) image signal, in a manner well known to those of ordinary skill in the art.

Detailed explanations of the edge extracting unit 3-9 will be given below with reference to FIG. 4 and FIG. 5.

Figure 4:
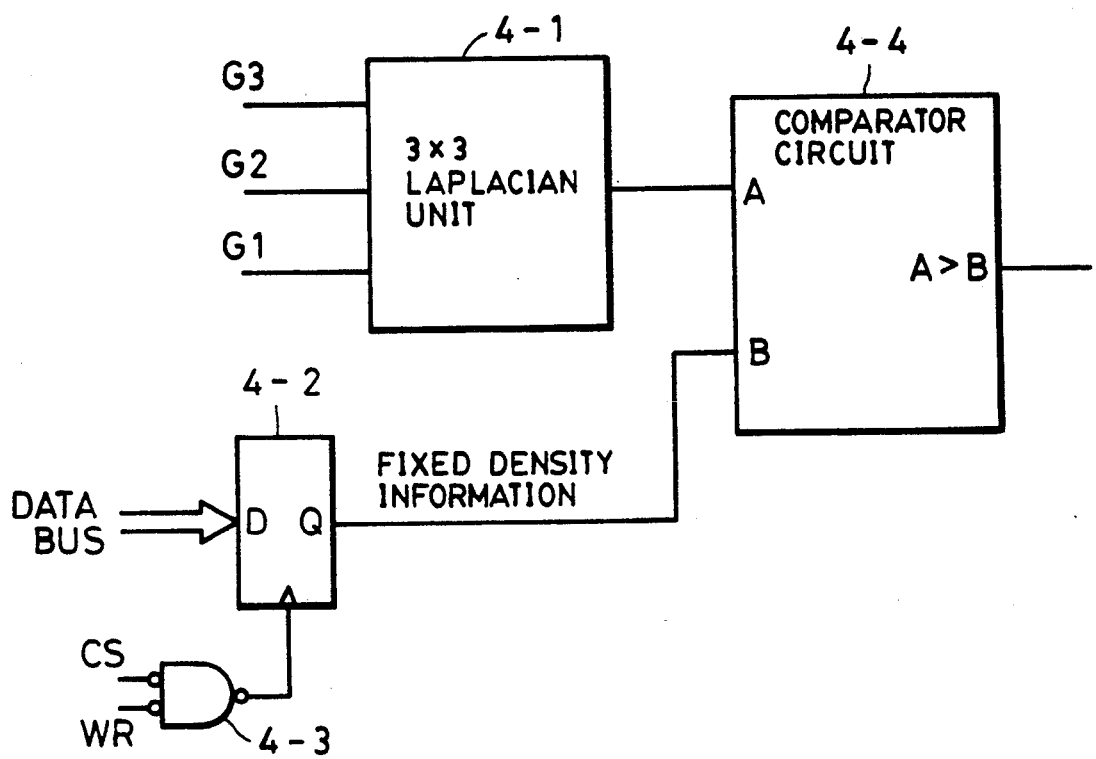
FIG. 4 is a block diagram showing details of an edge extracting unit according to the embodiment of FIG. 1.
Figure 5:
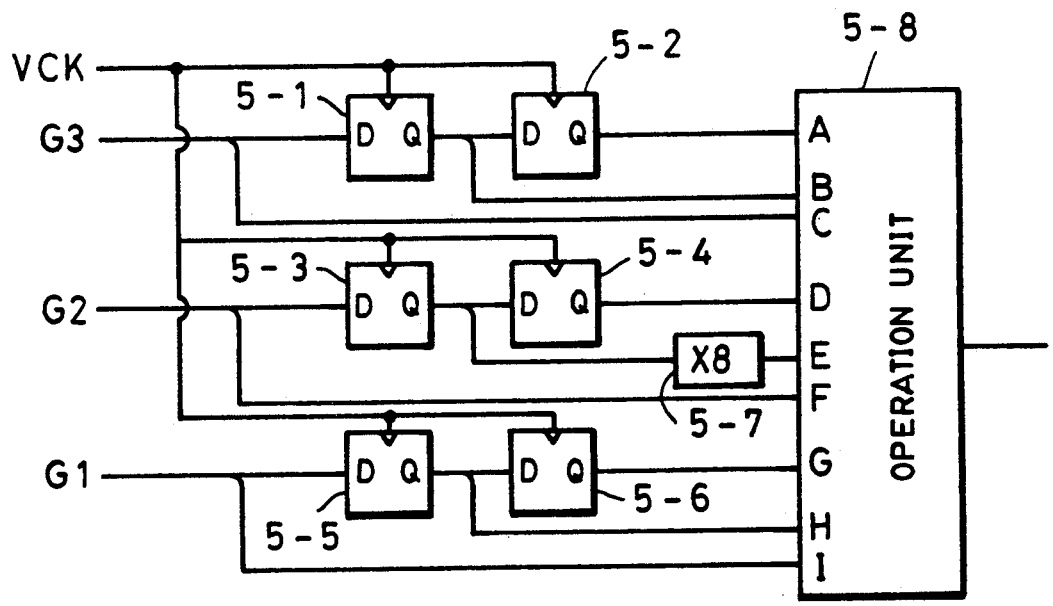
FIG. 5 is a block diagram showing details of a Laplacian operation unit.

FIG. 4 is a block diagram showing details of the edge extracting unit 3-9. FIG. 5 is a circuit diagram showing details of a 3×3 Laplacian unit 4-1 shown in FIG. 4. Image signals G1, G2, G3 shown in FIG. 4 and FIG. 5 correspond to green image information signals G1, G2, G3 of three consecutive lines of image, shown in FIG. 3.

Input image information is delayed by each of flip-flops (hereinafter referred to simply as "FF") 5-1 to 5-6 by using video clock signals VCK so as to make the 3 pixel×3 pixel matrix. A multiplier 5-7 is provided for multiplying the object pixel, i.e., the pixel currently of interest, output from FF 5-3 by eight. An operation unit 5-8 is also provided for carrying out the following operation by using each of input data A to I:

$$E-(A+B+C+D+F+G+H+I).$$

The operation result so obtained by the t 5-8 is input to a terminal A of a comparator circuit 4-4. A logical sum operation circuit (hereinafter referred to simply as "OR circuit") 4-3 is provided. The CPU 2-8 writes fixed density information into a FF 4-2 through a data bus 3-14. The fixed density information denotes a slice level for the edge extraction, and is input to a terminal B of the comparator circuit 4-4. The comparator circuit 4-4 outputs binary information representing whether it is true that "A>B". That is, when the fixed density information is set to a proper value, such as ½ of the maximum value of image information, the edge extracting unit 3-9 outputs binary information which assumes an active (or logic "1") state only at an edge portion.

Each of image information signals R, G, B, which are delayed for two lines by the FIFO's 3-6, 3-7, is input to a black judging unit 3-15 to produce binary information indicating whether the signals together represent black or not. The black judging unit 3.15 is structured with a ROM, and stores data for outputting a judging signal representing black when the image information signals R, G, B each have almost the same value.

In this embodiment, image discrimination information is produced by the above-described edge extracting unit 3-9 and the black judging unit 3-15.

The unit shown in FIG. 3 includes the CPU 2-8, a RAM 3-4 being used as a working area of the CPU 2-8, and a ROM 3-5 storing a processing procedure (a program of the CPU 2-8. The unit shown in FIG. 3 also includes an operation panel 1-5 (also shown in FIG. 1), and a digitizer unit 3-1 corresponding to the digitizer 1-3 and the designation pen 1-4 shown in FIG. 1. An address bus 3-13 and a data bus 3-14 for the CPU 2-8 are provided.

A variable magnification circuit 3-8 performs enlargement or reduction on the image information of each color R, G, B delayed for one line by the FIFO 3-6 in accordance with an instruction by the operation panel 1-5.

Detailed explanation of the variable magnification circuit 3-8 will be given below with reference to a block diagram shown in FIG. 6.

Figure 6:
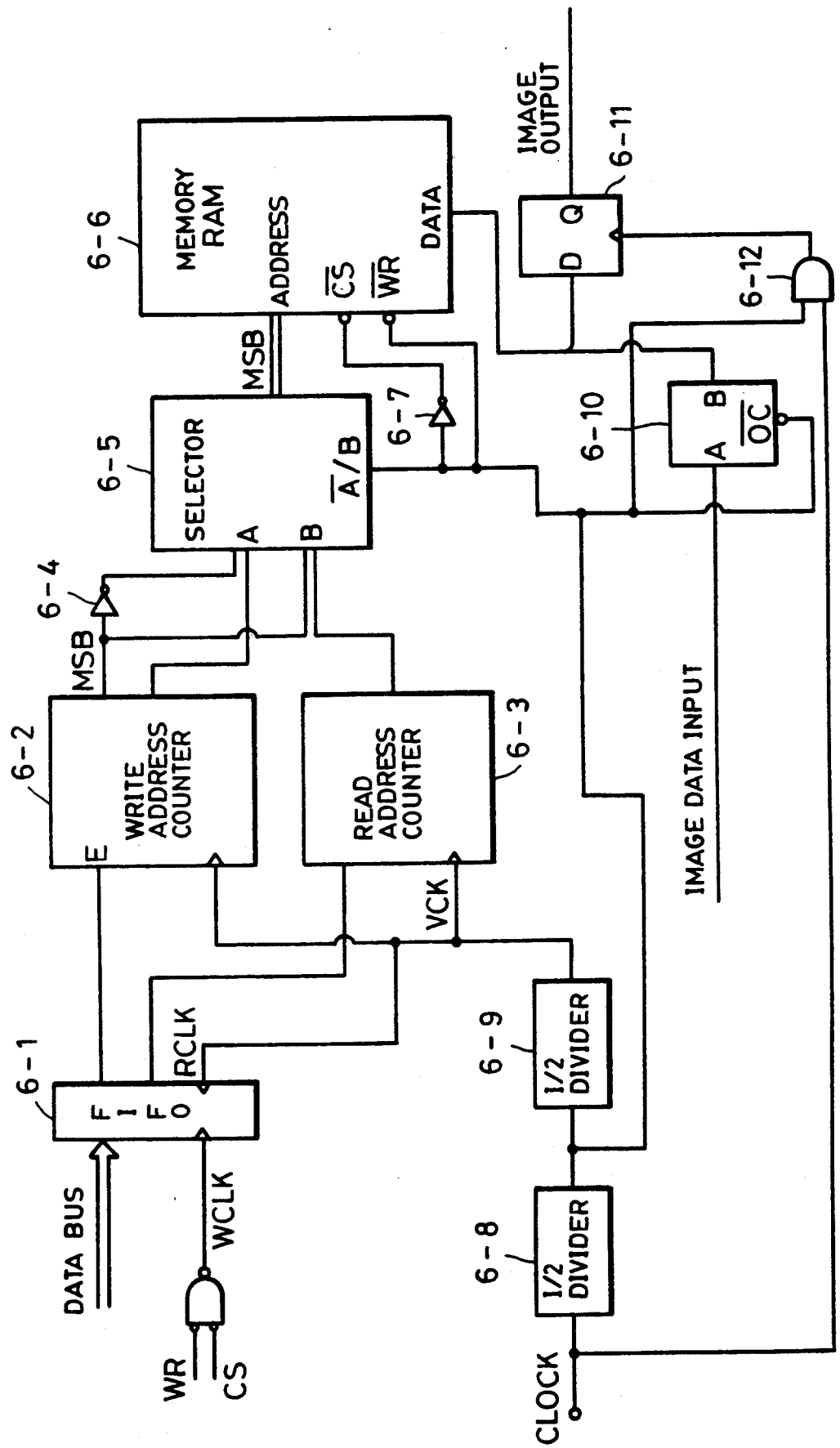
FIG. 6 is a block diagram showing details of a variable magnification circuit.

FIG. 6 shows one system for one color; it will be understood that circuits 6-6, 6-10, 6-11 are each provided in triplicate, one set for each of three colors.

In a case where the image information is to be reduced, the image signal is thinned out as it is written into the RAM 6-6, while in a case where the image information is to be enlarged, the image signal is read out repeatedly from the RAM 6-6. The RAM 6-6 has a capacity of two (2) lines for each color, and is used by switching its memory area in such a way that the writing address and the reading address do not overlap each other, as a result of which image data is delayed one line by the RAM 6-6.

Accordingly, considering the delay provided by the FIFO 3-6, the delay of one line provided by the variable magnification circuit 3-8 coincides with that provided by the edge extracting unit 3-9 and the black judging unit 3-15.

The CPU 2-8 Writes enable signals for the write address counter 6-2 and the read address counter 6-3 into FIFO 6-1 according to a designated magnification. ½ frequency dividers 6-8 and 6-9 produce video clock signals VCK which are obtained by dividing the frequency of reference clock signals CLOCK by four.

When an image scanning is started, FIFO 6-1 outputs enable signals according to the designated magnification, whereby each of counters 6-2 and 6-3 initiates its counting operation. A selector 6-5 switches the write address of the write address counter 6-2 and the read address of the read address counter 6-3 by using clock signals having a frequency which is twice as high as that of the video clock signals VCK. The selector 6-5 switches to the write cycle when the video clock signal VCK is at the low level, and switches to the read cycle when the video clock signal VCK is at the high level.

The RAM 6-6 is structured in such a way that its memory areas corresponding to the read address and the write address change alternately in response to a most significant bit signal MSB supplied from the write address counter 6-2 via the selector 6-5 and a signal which is obtained by inverting the most significant bit signal MSB by means of an inverter 6-4.

The circuit shown in FIG. 6 includes a buffer circuit 6-10 having an output control function, a FF 6-11, and a logical multiplication circuit (AND circuit) 6-12. These circuits 6-10, 6-11 and 6-12 control image data and the RAM 6-6 in cooperation with inputs to a $\overline{CS}$ terminal and a $\overline{WR}$ terminal of the RAM 6-6.

The bit map memory 3-10 shown in FIG. 3 inputs all information supplied from the edge extracting unit 3-9 and the black judging unit 3-15, and area designation information supplied from the CPU 2-8. The area designation information is set by designating an area using the digitizer unit 3-1, and by designating processing to be performed on the contents of the designated area using the operation panel 1-5.

In this embodiment, although detailed explanations about the various kinds of processing will not be given, the processes include, for example, trimming (framing), masking (blanking), character area processing, black character area processing, picture area processing, image shifting, color conversion, and image composition.

In a case where the data range for each element of the bit map memory 3-10 is eight bits, each element should have a capacity of six bits, excluding its capacity for and the black judging unit 3-15. That is in this embodiment, the bit map memory 3-10 can store area signals representing six kinds of processing for each element.

In this embodiment, for improving the judgment by the edge extracting unit 3 9 and the black judging unit 3-15, area signals representing a character area and a black character area, which are set by the operator in the course of area designation using the digitizer unit 3-1, are used necessarily as signals to be stored into the bit map memory 3-10.

Explanations of the bit map memory 3-10 will be given below with reference to FIG. 7.

Figure 7:
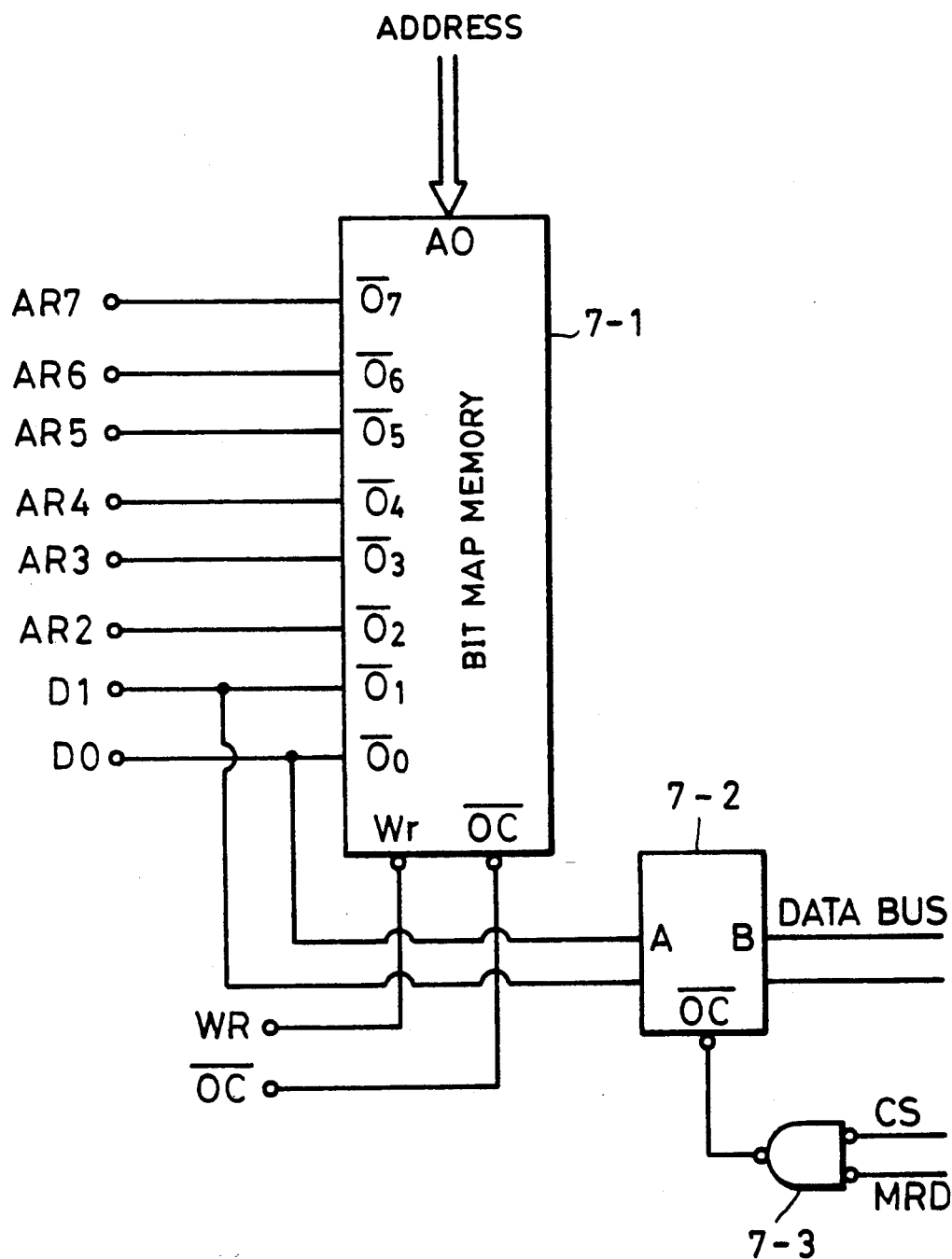
FIG. 7 is a block diagram showing details of a bit map memory unit.

The circuit shown in FIG. 7 includes a terminal $D_0$ for inputting a image discrimination signal supplied from the edge extracting unit 3-9, and a terminal $D_1$ for inputting an image discrimination signal supplied from the black judging unit 3-15.

The edge extracting unit 3-9 and the black judging unit 3-15 each perform image discrimination at the first original reading, and write image discrimination information into the bit map memory 7-1. Address control of the bit map memory 7-1 for writing of the image discrimination information will be described below.

Each unit of the image discrimination information written into the bit map memory 7-1 corresponds to an area of a size larger than that of a pixel processed by the image processing unit 2-6, and the size of the pixel is determined by the resolutions of the CCD sensor 2-3 and of the printing unit 2-7. Such size corresponding to each unit of the image discrimination information is determined so as to reduce the required capacity of the bit map memory 7-1; nevertheless, the image discrimination information is treated with a resolution sufficient to avoid problems in practice. For example, when each element of the bit map memory 7-1 is used for a 1 mm × 1 mm area, a bit map memory sufficient for a "A4" size original can be made using a 64K RAM.

While reading out the image discrimination information through an OR circuit 7-3 and a buffer circuit 7-2 having an output control function, the CPU 2-8 writes newly-formed image discrimination information and other area signals (input through terminals AR2-AR7) into the bit map memory 7-1. In this case, the area signals to be written are information designated by the digitizer unit 3-1. The changing points and the kind of the designated area are stored in the RAM 3-4, and the CPU 2-8 writes bit map information, i.e., the newly-formed image discrimination information and the other area signals, into the bit map memory 7-1 based on the information stored in the RAM 3-4.

As described above, this apparatus permits one to designate an area in order to decrease misjudgments about the image discrimination signals, and is structured in such a way that the result of ANDing or ORing of the area designation information with the image discrimination information can be written into the bit map memory.

In a case where image discrimination is not executed and the copying operation is performed at the first original scanning (for example, in a case where the copying operation is in a hurry), information similar to the other area signals is input to the terminals $D_0$, $D_1$ instead of the image discrimination signals.

Detailed explanations of the address counter unit 3-11 shown in FIG. 3 will be given below with reference to FIG. 8.

Figure 8:
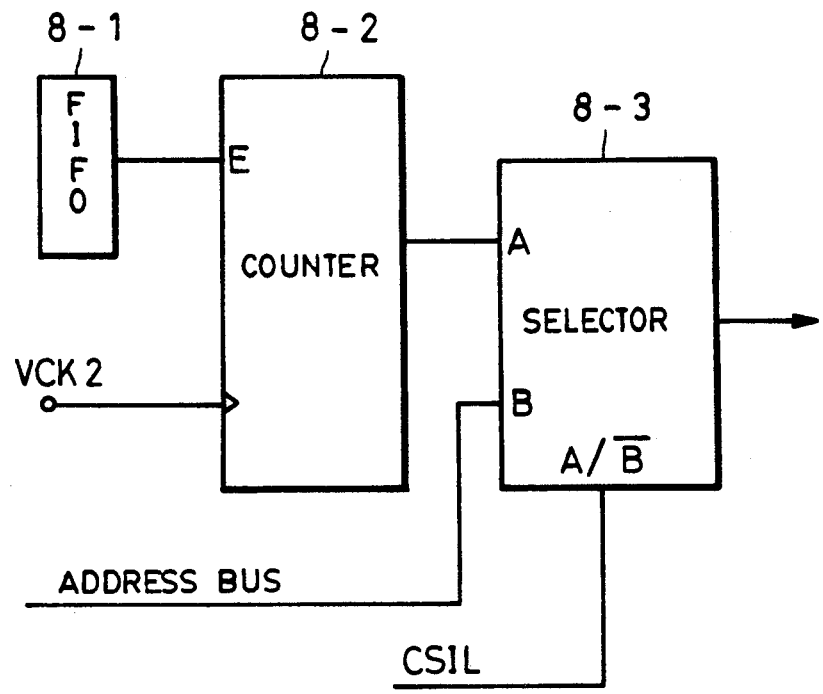
FIG. 8 is a block diagram showing details of an address counter unit.

In FIG. 8, VCK 2 denotes a signal obtained by dividing the frequency of the video clock signals VCK, and corresponds to a 1 mm × 1 mm area size. A FIFO circuit 8-1 is provided for controlling the supply of an enable signal to the E terminal of an address counter 8-2. In a case where image discrimination is executed, a selector 8-3 selects its A input, receiving the output of the counter 8-2. Meanwhile, in a case where the CPU 2-8 writes the area signals into the bit map memory 3-10, the selector 8-3 selects its B input, the address bus 3-13.

When image magnification is executed, the image signal is enlarged or reduced by the variable magnification circuit 3-8. Therefore, in the case of image magnification, the area signals are written into the bit map memory 3-10 by controlling the address counter unit 3-11 according to a designated magnification. Since image discrimination is executed at the first original scanning, the original image can be discriminated with the resolution of real size even though a magnification is designated.

Accordingly, the following advantage can be obtained. For example, in the case of image reduction, the image information is thinned out because the scanning speed of the optical system is faster than normal, as a result of which accurate edge extraction can be expected to be difficult. However, according to this embodiment, the first original scanning is executed with the same speed as real size scanning, whereby accurate image discrimination can be performed even if a copying magnification is designated.

Explanations of the image processing circuit 3-12, which controls the image signals using the area signals and the image discrimination signals stored in the bit map memory 3-10 shown in FIG. 3, will be given below with reference to FIG. 9.

Figure 9:
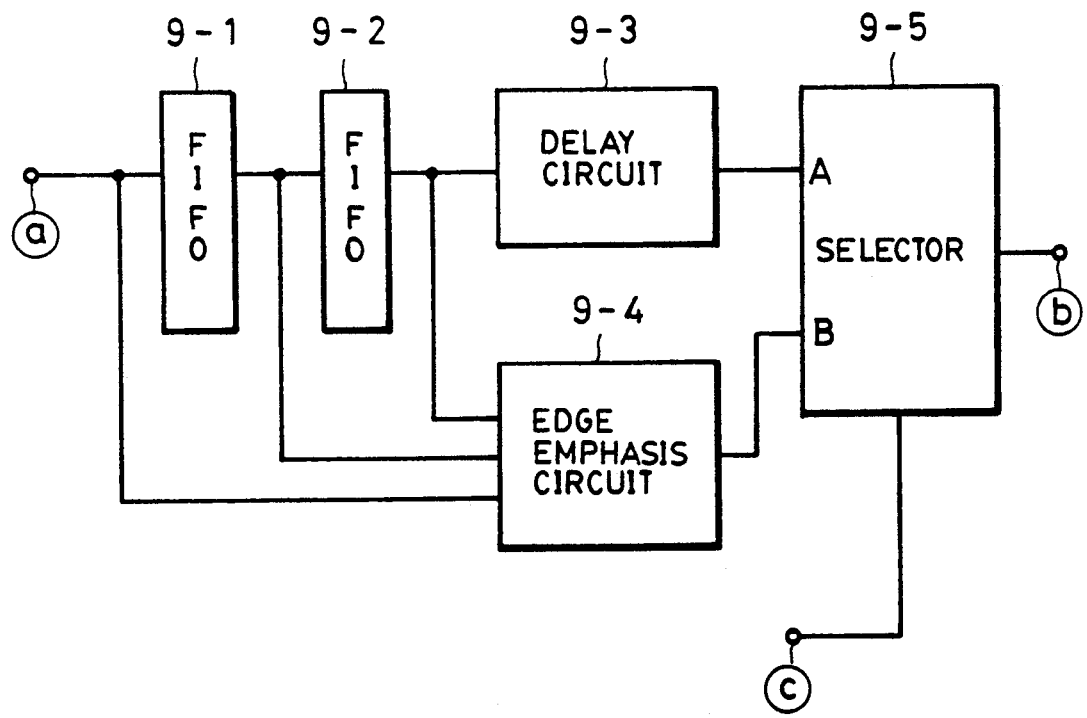
FIG. 9 is a block diagram showing details of an image processing circuit.

The circuit shown in FIG. 9 includes a terminal (a) for inputting an image signal, a terminal (b) for outputting an image signal, and a terminal (c) for inputting a control signal supplied from the bit map memory 3-10.

According to this embodiment, the system shown in FIG. 9 changes an edge emphasis circuit 9-4 based on the control signal. This has resulted in the effect that only the black character portion of an original can be reproduced sharply by executing edge emphasis intensely on a portion of the image signals, which is judged as black and is extracted as an edge portion based on the image discrimination information. In the case where an original having a color photograph accompanied by a caption is reproduced, there is the advantage that the black characters can be image-processed sharply and the photograph can be image-processed softly.

The image signals input via terminal (a) are delayed for two lines by FIFO's 9-1 and 9-2. Then the edge emphasis circuit 9-4 forms a 3 pixel×3 pixel matrix to execute a Laplacian operation. A delay circuit 9-3 is provided to complement the delay due to the edge emphasis circuit 9-4. That is, the delay circuit 9-3 adjusts the timing with which the image signals are input to a selector 9-5. The selector 9-5 switches the image signals output from the delay circuit 9-3 or the edge emphasis circuit 9-4 based on the image discrimination signals input via terminal (c), so that the black character portion, only, is edge-emphasized finely.

Figure 11B:
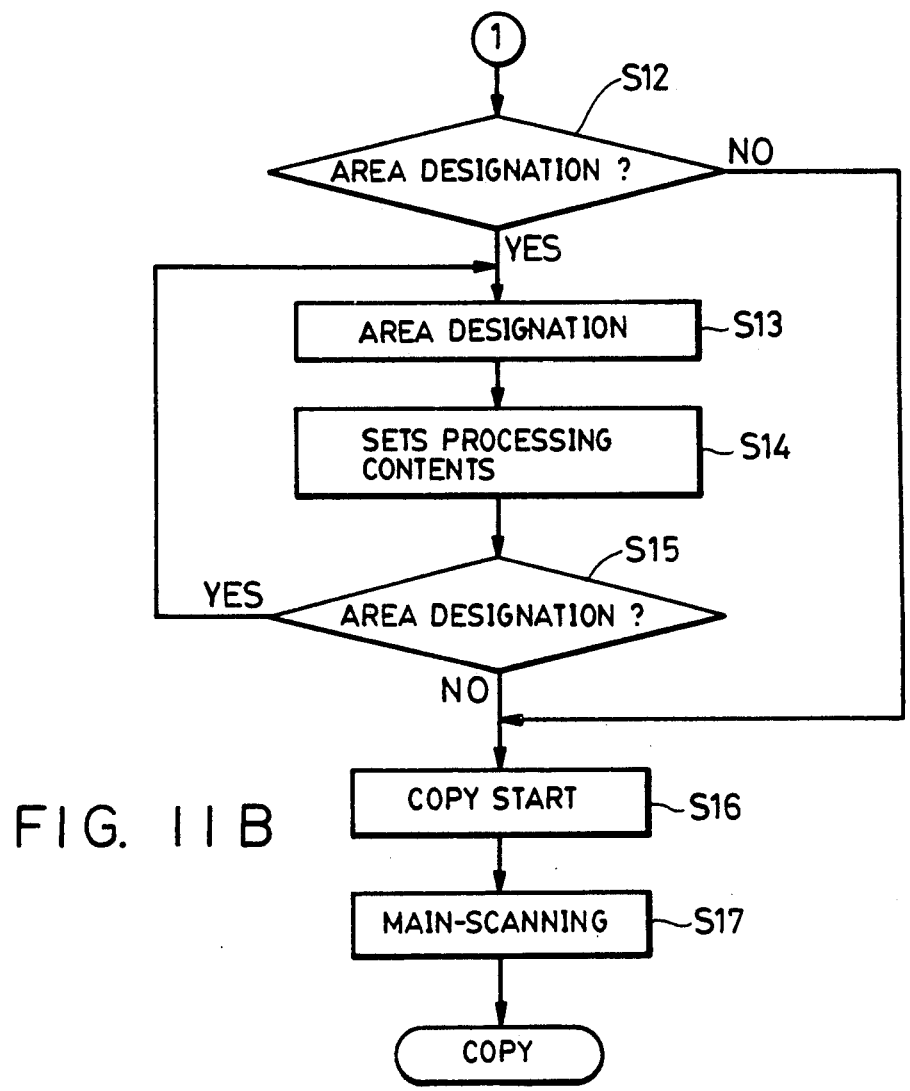
Figure 12:
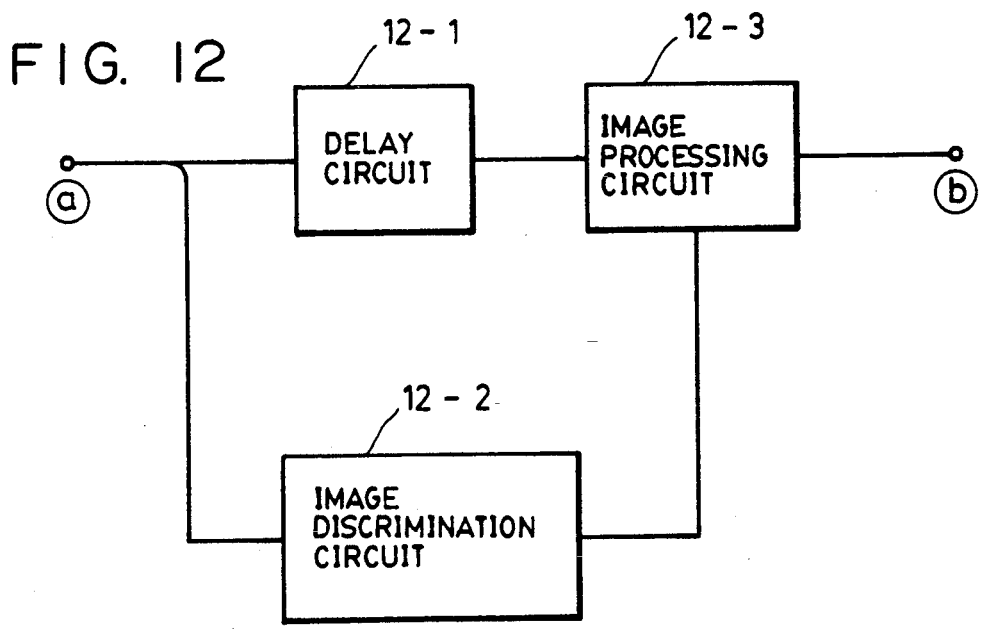
FIG. 12 is a block diagram showing a known image processing apparatus.

FIG. 11A and FIG. 11B are flow charts for explaining a processing procedure according to the foregoing embodiment.

In step S1, magnification is set by the operation panel 3-2. As described below, the image discrimination signals are written into the bit map memory 3-10 in accordance with the set magnification.

In step S2, the program stored in the ROM 3-5 checks whether image discrimination is to be carried out or not. According to this embodiment, the original scanning is executed twice in the case where image discrimination is carried out, while the copying operation is completed by a single original scanning in the case where image discrimination is not carried out. Therefore, an operator can select either way depending on his rush, etc.

If image discrimination is carried out, the flow advances to S3, where the kind of image discrimination to be performed is selected. As described above, this apparatus can extract an edge portion and execute black judgment. In the case where the operator wants to extract a black character, both edge extraction and black judgment should be selected. It is also possible to select a color conversion, which will be described in connection with the second embodiment.

In step S4, it is determined whether an area designation is to be executed or not. Various kinds of area designation, such as designating a rough black character portion for decreasing misjudgment in the black character extraction, or various kinds of image processing, such as, trimming (framing), masking (blanking), image shifting, and the like, may be designated irrespective of the image discrimination.

If area designation is to be executed, the flow advances to step S5, where the operator inputs the designated area. Then, in step S6, processing contents of the designated area are set. In step S7, in the case where the area discriminated by the image discrimination operation is designated as the processing area, it is determined which operation should be performed on the area signals and the image discrimination signals, ANDing them or ORing them. For example, when an image discrimination for discriminating a black character is executed for the whole original image, the original image excepting the black character may not be processed as requested because of misjudgment in the image discrimination. In such case, a character area to be processed should be designated roughly, and the designated character area can be ANDed with the discrimination result obtained by the image discrimination.

In the case where the color conversion, which will be described in connection with the second embodiment, is carried out, an area excepting the portion which is judged as a certain color by a conventional method, may be designated. Further, the designated area and the portion are ORed in the case where color conversion has to be applied to the designated area and the portion.

In step S8, the program checks whether other area designation is to be executed or not. If the area designation is completed, the flow advances to step S9, where a copying operation is started. Then, in step S10, the image discrimination is carried out using an original pre-scanning, whereby the image discrimiration signals are written into the bit map memory 3-10. As described above, the image discrimination signals are read out from the bit map memory 3-10 once, and newly-formed image discrimination signals obtained by the operation are written into the bit map memory 3-10 with the area signals in accordance with the set magnification.

In step S11, an original main-scanning operation for making a copy is performed in accordance with the set magnification.

In the case where image discrimination is carried out and area designation is not carried out, the flow advances to step S9 from step S4, where the above described processing is executed, except the area designation, to complete the copy operation.

On the other hand, in the case where image discrimination is not carried out, the flow advances to step S12 from step S2, where the program checks whether area designation is to be executed or not. If area designation is to be executed, the flow advances to step S13, where the operator inputs the designated area. Then, in step S14, processing contents of the designated area are set.

In step S15, the program checks whether other area designation is to be executed or not. If area designation is now complete, the flow advances to step S16, where a copying operation is started. Then, in step S17, the copying operation is completed with the first original scanning.

In the case where neither image discrimination nor area designation is carried out, the flow advances to step S16 from step S12, where the copying operation is completed with the first original scanning.

In the above-described embodiment, the image discrimination signals corresponding to the real size are written into the bit map memory 3-10 once, and then, the newly formed image discrimination signals corresponding to the set magnification are written into the bit map memory 3-10. However, it is also possible to enlarge or reduce the image discrimination signals in accordance with the set magnification when the image discrimination signals are written into the bit map memory for the first time by the original pre-scanning.

Embodiment 2

In the above-described embodiment, the edge extracting unit 3-9 and the black-judging unit 3-5 are explained as image discrimination circuits. Explanations of a color judgment circuit will be given below as explanations of another image discrimination circuit.

In the conventional method, a color judgment for use in color conversion has been performed on image information which is to be smoothing-processed, in order to decrease the likelihood of misjudgment or error therein. In the case where enlarged image information is not interpolated finely, a dart or a noise component in the enlarged image information cannot be removed completely by smoothing processing, and therefore misjudgment of a color may occur.

In order to mitigate the above described problem, the color judgment should be performed at the first original scanning using a real-size scanning speed simultaneously with the image discrimination. Further, the result of the color judgment should be stored in the bit map memory in accordance with a set magnification. As a result, a fine color judgment can be performed even if a magnification is designated.

The basic circuit structure of an image processing unit according to the second embodiment will be the same as the circuit shown in FIG. 3. In this embodiment, however, the image processing circuit 3-12 should be replaced with a known color conversion circuit, and the edge extracting unit 3-9 and black-judging unit 3-15 should be replaced with a color judging circuit.

Explanations of the color judging circuit will be given below with reference to FIG. 10.

Figure 10:
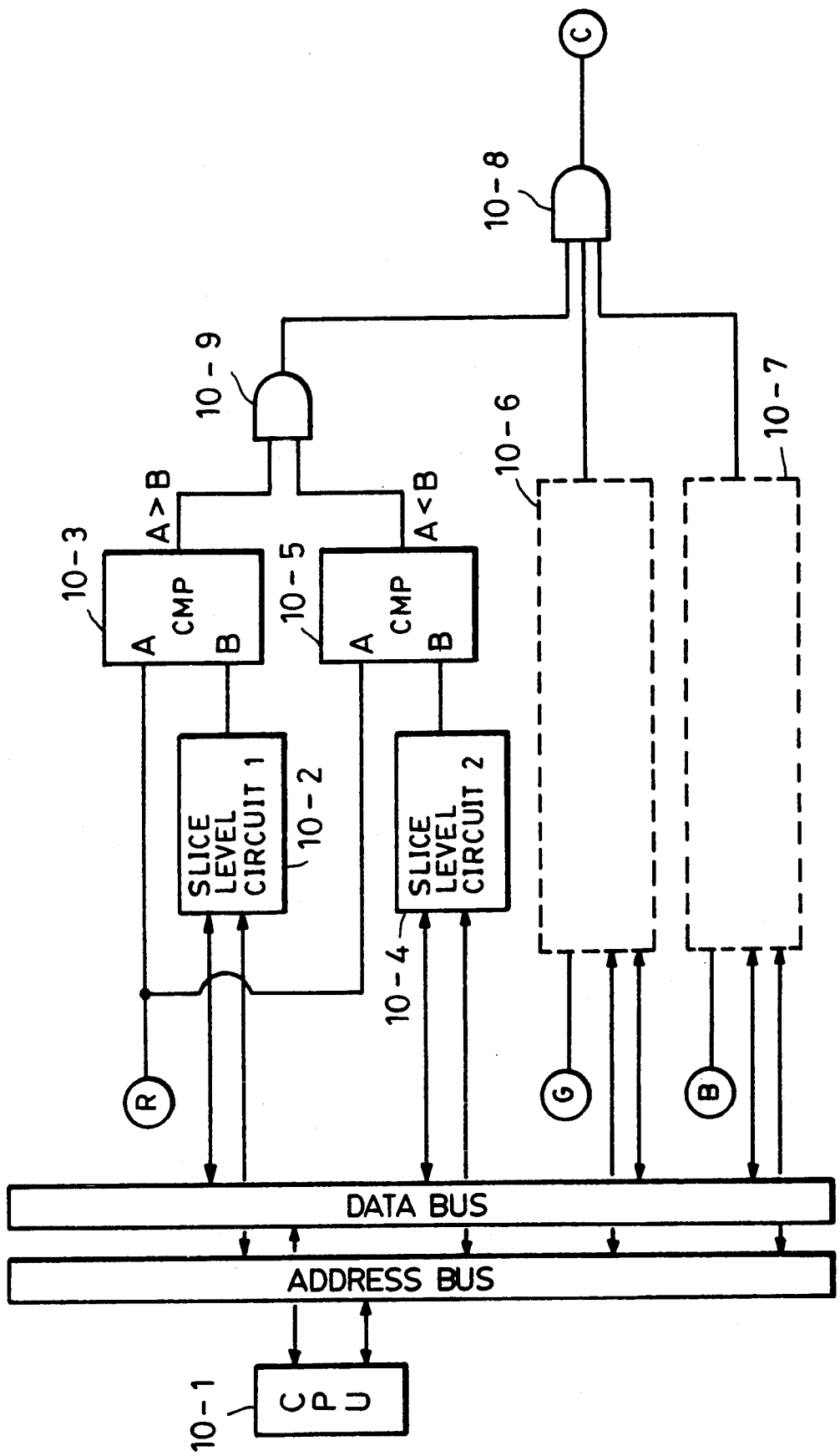
FIG. 10 is a block diagram showing a color judging circuit according to a second preferred embodiment.

The circuit shown in FIG. 10 includes a CPU 10-1 for controlling the color judging circuit. In FIG. 10, peripheral circuits of the CPU 10-1, an operational panel and the like are omitted.

The circuit includes input terminals (R), (G) and (B) for inputting red (R), green (G) and blue (B) image signals, respectively, and an output terminal (c) for outputting binary information representing the result of the color judging.

The red image signal R will be used as an example for explaining the function of the circuit. An upper limit $R_H$ and a lower limit $R_L$ of a color judging range relating to red (R) are set in advance for slice level circuits 2 (10-4) and 1 (10-2), respectively as slice levels. Comparators 10-3 and 10-5 compare the red image signal R with the slice levels $R_L$ and $R_H$, respectively, and output judging signals representing the conditions $R_L<R$ and $R_H>R$, respectively. Then, an AND circuit 10-9 outputs a signal representing a condition $R_H>R>R_L$. The green image signal G and the blue image signal B can be judged in a similar manner. Each of blocks 10-6 and 10-7 has the same structure with the judging circuit for the red image signal R.

Accordingly, if each of the three color image signals R, G and B is within the limits of the applicable slice levels, an AND circuit 10-8 outputs a color conversion signal for converting the image signals into a certain color.

As mentioned above, according to this embodiment, the image discrimination operation can be executed at the first original scanning using a real-size speed, and the image discrimination signals are stored in the bit map memory, of which signals the resolution is lower than that of the image signal whose characteristic is to be discriminated. Further, an appropriate image processing can be executed at the second original scanning with an arbitrary magnification in accordance with the image discrimination signals.

Accordingly, there is the advantage that the scale of the image discrimination circuit can be minimized.

Embodiment 3

According to the third embodiment, the same structure as in FIGS. 1 and 2 and can be used basically, so that detailed explanations about the portions common with FIGS. 1 and 2 will be omitted. However, since the image processing unit 2-6 shown in FIG. 2 has a different structure from that used in the first and the second embodiments, explanation thereof will be given below.

The image processing unit 2-6 according to the third embodiment includes an image discrimination unit for discriminating a black character area, and a log conversion unit for converting color information R, G and B into signals C, M and Y which correspond to the amounts of three colored toners cyan, magenta and yellow used in the printer. The unit 2-6 also includes a masking conversion unit for performing a signal conversion according to the output-color characteristics of the printer, and an undercolor removal (UCR) unit for separating a gray component from the signals C, M and Y and forming a black signal BK.

Detailed explanations of the image processing unit: 2-6 having a black area judging unit and a bit map memory, etc., will be given with reference to FIG. 13.

Figure 13:
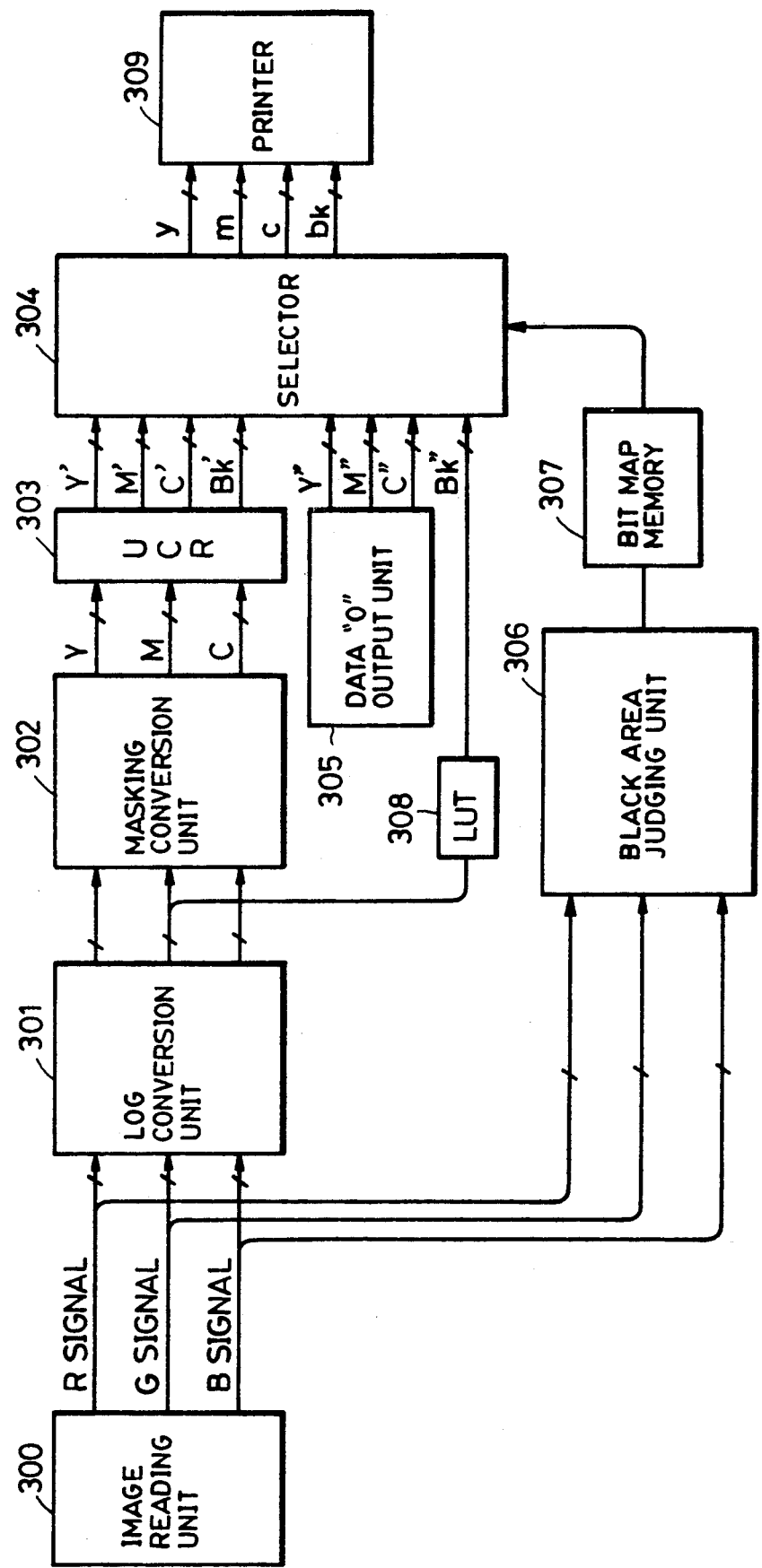
FIG. 13 is a block diagram showing details of an image processing unit according to a third preferred embodiment.

The unit shown in FIG. 13 includes an image reading unit 300 for reading an original by using a CCD sensor or the like, a log conversion unit 301 for converting color signals R, G and B into the signals C, M and Y, and a masking conversion unit 302 for performing signal conversion according to the output-color characteristics of the printer 309.

The unit also includes a UCR unit 303 for separating a gray component from the signals C, M and Y and forming the black signal BK, and a selector 304 for selecting between signals output by the UCR unit 303 and output from a data "0" output unit 305, according to an area judging signal output by the bit map memory 307.

The color signals R, G and B, which are output from the image reading unit 300, such as a CCD sensor, by the first scanning for original reading, are sent to a black area judging unit 306. In the case where the black area judging unit 306 has judged that a certain image area is a black area, or a non-black area, binary information "1", or "0" is stored in the bit map memory, respectively.

When the second original scanning is executed, the color signals R, G and B input by the image reading unit 300 are converted into the signals Y, M and C by the log conversion unit 301 and the masking conversion unit 302, and the signals Y, M and C are input to the selector 304 as signals Y', M' and C', and BK' after being processed by the UCR unit 303.

Meanwhile, the area judging signal is read out from the bit map memory 307. In the case where the area judging signal "1" representing a black area is read out, the selector 304 selects signals Y", M", C", and BK" as output signals y, m, c, and bk to output to the printer 309.

Each of the signals Y", M", and C" is output from the data "0" output unit 305, and has a value "0". Therefore, each value of the output signals y, m, c output from the selector 304 should be "0". The signal BK" is obtained by executing density correction on the green signal G by means of a look-up-table (LUT) 308 after performing a log conversion on the same by means of the log conversion unit 301.

On the other hand, in the case where the area judging signal "0" representing a non-black area is read out, the selector 304 sends the signals Y', M', C', and BK' to the printer 309.

Explanation of processing for changing the resolution of the bit map memory 307 will be given below with reference to FIG. 14.

According to this embodiment, a character area is designated by the digitizer 1-3 and the designation pen 1-4, and the resolution of the bit map memory 307 is changed in accordance with the designated character area. The capacity of the bit map memory 307 can be 1 M bit; for example.

Figure 14:
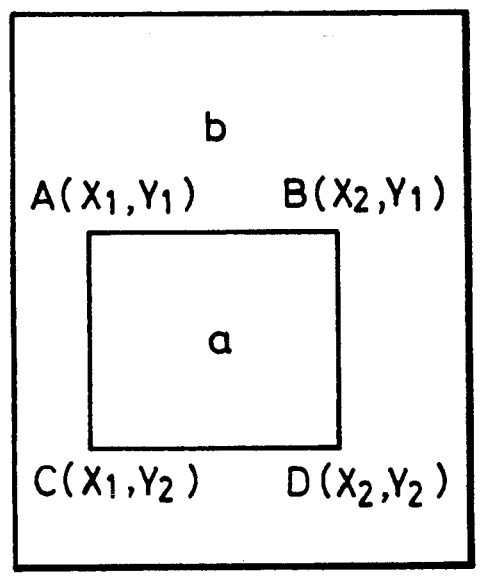
FIG. 14 is an illustration showing an original.

FIG. 14 shows an original, wherein an area "b" demotes a photographic area, and an area "a", which is surrounded by four (4) points A, B, C, and D, denotes an area mixing characters with a photograph or a picture or the like. When the four points A (X1, Y1), B (X2, Y1), C (X1, Y2), and D (X2, Y2) are designated via the designation pen 1-4 and a black character processing is selected via the operation panel 1-5, the CPU 2-8 calculates a resolution by using the size of the area "a", i.e., (X2−X1)×(Y2−Y1) (mm), and the memory capacity 1 M bit. The resolution G ($_{dpi}$) is calculated in accordance with the following formula.

$$G_{(dpi)} = 2.54 \times 10^4 \times \frac{1}{(X2 - X1) \times (Y2 - Y1)} \qquad 1$$

Considering the structure of an address counter of the bit map memory 307, it is not practical to make the address counter count to be adapted to every resolution. Therefore, as a practical matter, the address counter should select a partitioned resolution appropriately. According to this embodiment, the address counter is structured in such a way that it can change the resolution from 400 dpi to 100 dpi in increments of 25 dpi. Accordingly, a partitioned resolution, which is just below the resolution G ($_{dpi}$) obtained by formula (1), is selected. For example, if the calculated result obtained by formula (1) is 210 dpi, 200 dpi is selected by the address counter.

Explanation of an address generation unit of the lit map memory 307 will be given below with reference to FIGS. 15 and 16.

Figure 15:
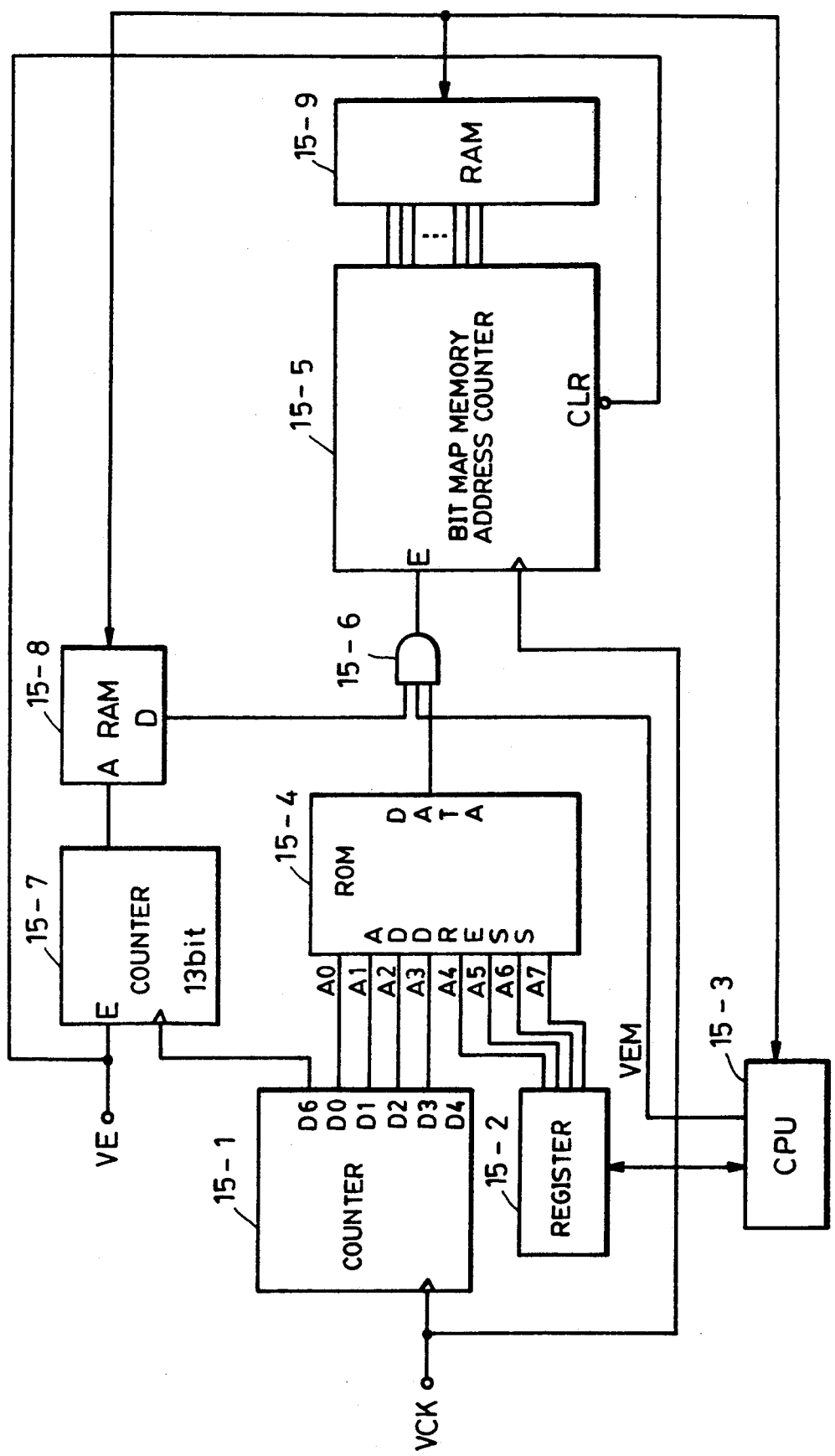
FIG. 15 is a block diagram showing an address control circuit of a bit map memory.

The frequency of a video clock signal VCK shown in FIG. 15 corresponds to 400 dpi because the maximum resolution of the apparatus is 400 dpi. A video enable signal VE denotes a section signal indicating an image effective section. An enable control signal VEM relating to the sub-scanning direction Y is a signal controlled by a timer of a CPU 15-3 according to resolution.

The circuit shown in FIG. 15 includes a 7 bit counter 15-1, a register 15-2, the CPU 15-3, and a 256×1 bit ROM 15-4. The circuit also includes a 20 bit map memory address counter 15-5, an AND circuit 15-6, a 13 bit counter 15-7, an 8K×1 bit RAM 15-8, and a 1 M bit RAM 15-9. The above-described memory capacity corresponding to an original size "A4" is calculated to keep its capacity to a minimum. Accordingly, it is practically required to devise the structure of the memory.

Figure 16:
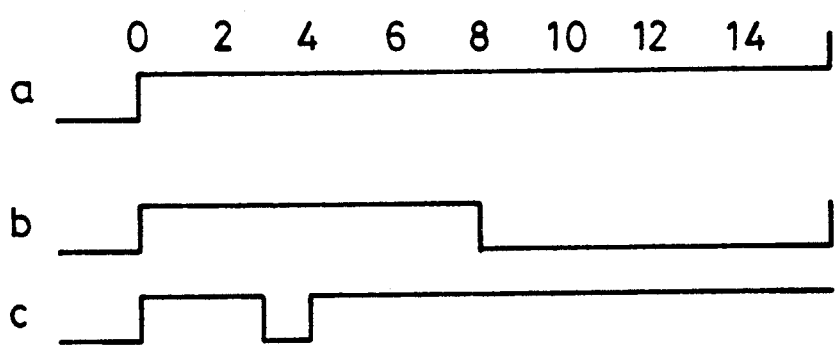
FIG. 16 is a timing chart of the output of data stored in a ROM.

FIG. 16 shows an example of data stored in the ROM 15-4.

The following descriptions relate to a method for storing the area judging signals into the bit map memory 307 with 400 dpi resolution.

A clock signal input to the counter 15-7 corresponds to 6.25 dpi resolution (400/2$^6$=6.25) because the video clock signal VCK corresponds to 400 dpi resolution. The resolution of RAM 15-8 approximates to 4 mm×4 mm area size if the video enable signal VE can be enabled once sixty-four (64) lines concerning the sub-scanning direction. Thus, RAM 15-8 has a capacity for one page of "A4" size because its capacity is 8K×1 bits.

First of all, the CPU 15-3 writes binary information "1" into an area of RAM 15-8, which corresponds to the interior of an area A(X1, Y1), B(X2, Y1), C(X1, Y2), and D(X2, Y2) designated via the designation pen 1-4. Then, when the original scanning is executed, the address counter 15-5 is controlled to be enabled only in the area designated by RAM 5-8. While the address counter 15-5 is enabled, it should count up with 400 dpi resolution. Therefore, the output of the ROM 15-4 should be enabled always. That is, data shown in FIG. 16 may be selected as data output from the ROM 15-4.

The numerals shown at the top of FIG. 16 denote the four least significant bits of the address of the ROM 15-4. In the case where the area judging signals are stored in the bit map memory 307 with 200 dpi resolution, the data shown in FIG. 16b should be selected. Similarly, in the case where data shown in FIG. 16c is selected the resolution of the bit map memory 307 should be 375 dpi.

As described above, according to this embodiment, the resolution of the bit map memory storing the area judging signals can be changed in accordance with the original. Thus, image processing can be executed efficiently with a limited memory capacity.

Especially, in the case where an occupation rate of a black area to a whole original is fairly low, judging result information representing a black area can be stored in the memory with high resolution, e.g., the highest resolution 400 dpi. Further, as compared with a method that can perform real time black area processing without using a bit map memory, there is the advantage that one can minimize the hardware scale because it is not required to delay image information for delaying of area judging processing.

Embodiment 4

Explanation of the fourth embodiment will be given below with reference to FIG. 17.

Figure 17:
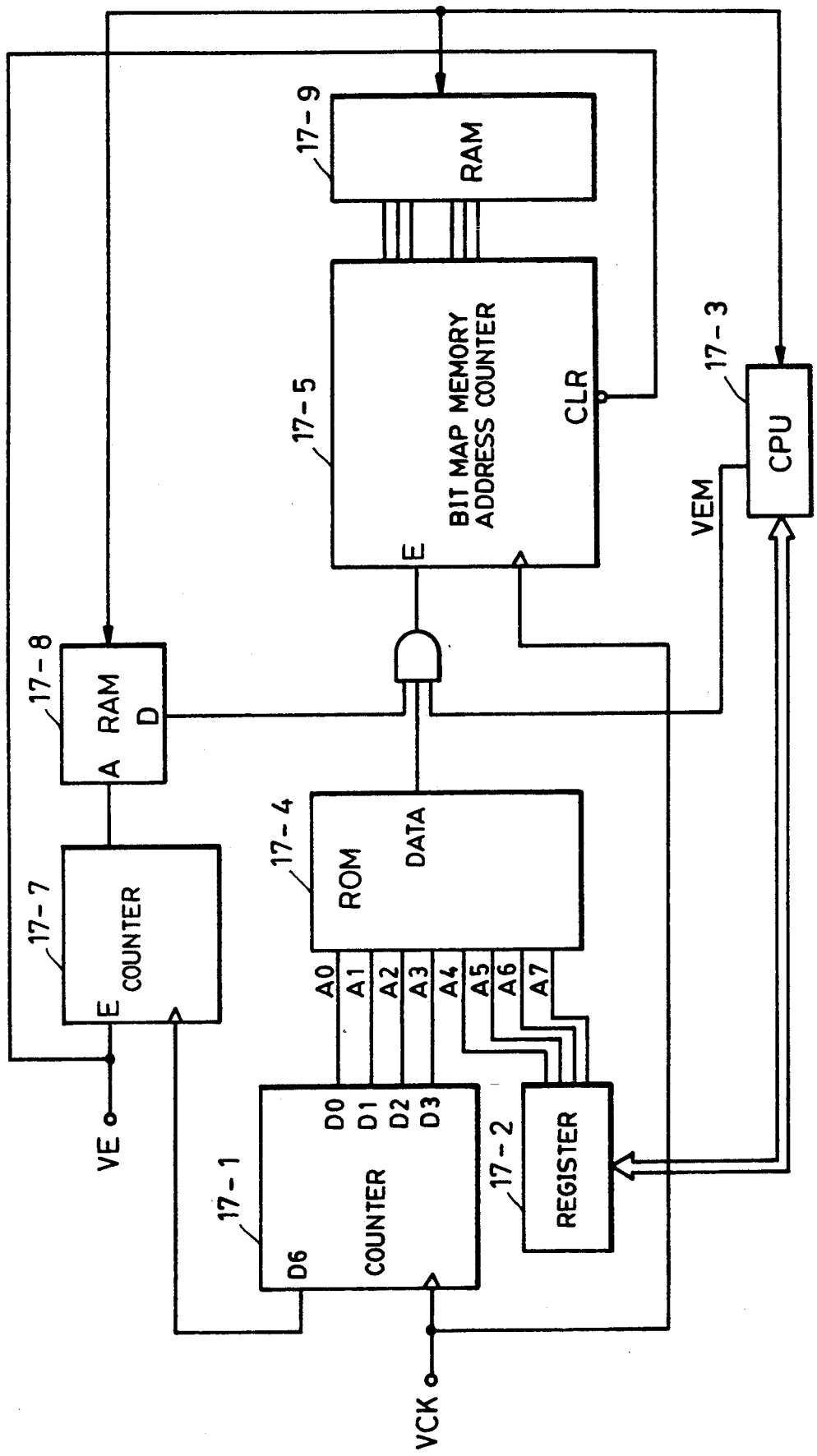
FIG. 17 is a block diagram showing an address control circuit according to a fourth preferred embodiment.

In FIG. 17, reference numerals 17-1 to 17-8 are used to denote elements corresponding to circuits 15-1 to 15-8 shown in FIG. 15, so that explanations of circuits 17-1 to 17-8 will be omitted.

When the first original scanning is executed, the area judging signals corresponding to the whole original are stored in the RAM 17-9 with rough resolution. Then, the CPU 17-3 reads the contents of the RAM 17-9, and judges with the resolution of 4 mm×4 mm area size whether a black area exists or not.

Figure 18:
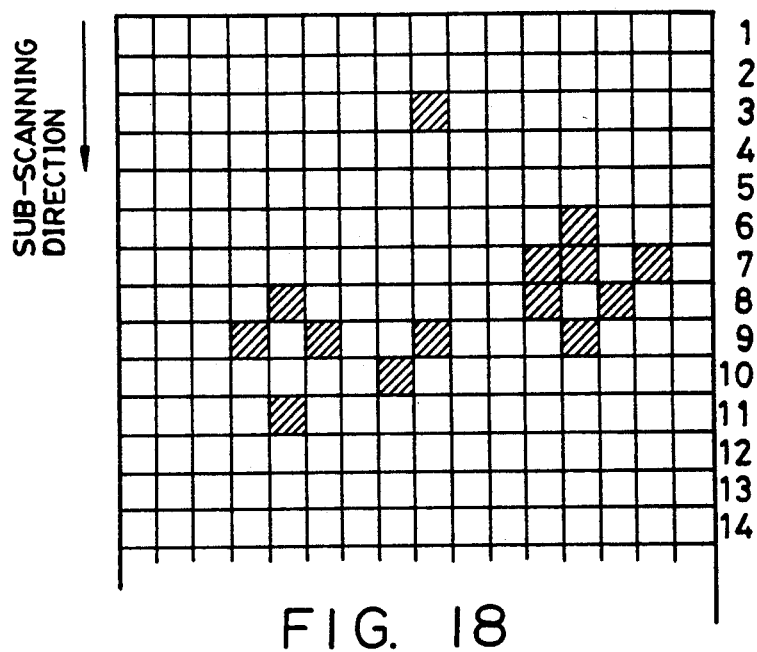
FIG. 18 is a chart showing a black area in the fourth embodiment.

FIG. 18 shows the contents of the RAM 17-9. In FIG. 18, cross-hatched portions denote black areas.

In the case where the capacity of the RAM 17-9 is larger than that of the RAM 17-8, the contents of the RAM 17-9 are divided into blocks. Then, the CPU 17-3 judges for each block whether each block is a black area or not, and writes the judging signals in the RAM 17-9.

Then, the CPU 17-3 calculates the size of the black area, and further calculates an appropriate resolution for the second original scanning. When the second original scanning is executed, the CPU 17-3 stores the judging results with fine resolution in the bit map memory 17-9.

By repeating the above-described operation plural times, the judging results identifying the black areas can be stored in the bit map memory effectively with less memory capacity.

Embodiment 5

Figure 19:
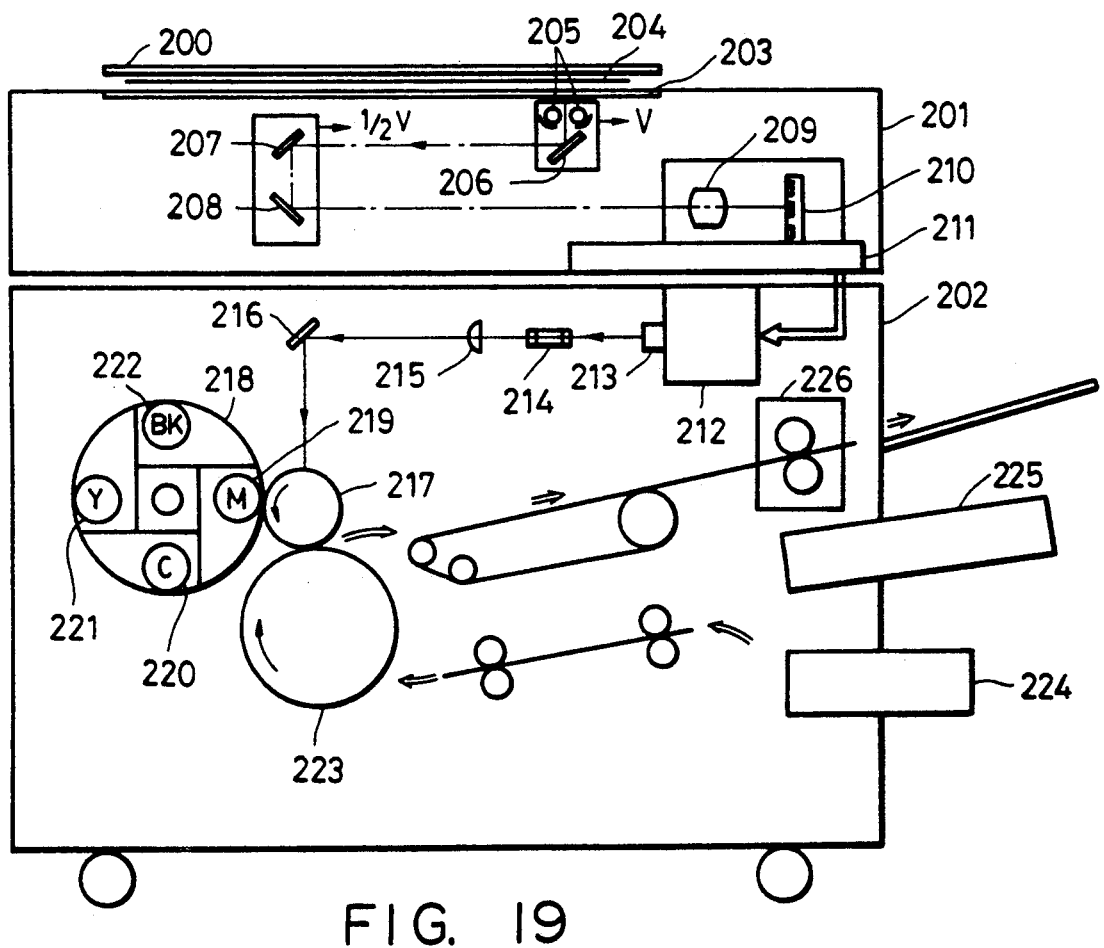
FIG. 19 is a block diagram showing the structure of an image processing apparatus according to a fifth preferred embodiment.

FIG. 19 is a block diagram for explaining the structure of an image processing apparatus according to the fifth embodiment. The apparatus shown in FIG. 19 includes an image scanner unit 201 for reading an original and performing digital signal processing, and a printer unit 202 for printing out an image corresponding to the original read by the image scanner unit 201 on a sheet in full color.

The image scanner unit 201 includes a copyboard cover 200 having a mirror surface. An original 204 placed on an original support plate (hereinafter referred to simply as a "platen") 203 is illuminated by lamps 205, and the reflected light is directed by mirrors 206 to 208 through a lens 209, and is focused on a three-line sensor 210, which is structured with an imaging device such as a charge-coupled device (CCD). The information in the reflected light, after conversion to an electric signal by sensor 210, is transmitted to a signal processing unit 211 as a red component signal (R), a green component signal (G), and a blue component signal (R) for full-color information.

The lamps 205 and mirror 206 move mechanically at a speed V in a direction perpendicular to an electrical scanning direction of the line sensor 210. Similarly, mirrors 207 and 208 move at a speed V/2 in the same direction, with the lamps 205, whereby the whole original is scanned. The signal processing unit 211 processes the signals obtained by reading the original electrically, and decomposes the signals into a magenta component signal (M), a cyan component signal (C), a yellow component signal (Y), and a black component signal (BK) to send to the printer unit 202. One of the component signals M, C, Y, and BK is sent to the printer unit 202 at the first original scanning by the image scanner unit 201, so that one printing-out operation can be completed by scanning the original four times.

The image signals M, C, Y, and BK sent via the image scanner unit 201 are transmitted to a laser driver 212. The laser driver 212 modulates a semiconductor laser 213 in accordance with the image signals. The laser beam emitted from the semiconductor laser 213 is scanned on a photosensitive drum 217 by means of a polygonal mirror 214, an f$\theta$ lens 215, and a mirror 216.

The printer unit 202 also includes a rotative developing device 218 structured with a magenta developing unit 219, a cyan developing unit 220, a yellow developing unit 221, and a black developing unit 222. These four developing units contact the photosensitive drum 217 alternately, and electrostatic latent images formed on the photosensitive drum 217 are developed by the respective toners.

The printer unit 202 further includes a transfer drum 223 for carrying a sheet fed from a paper cassette 224 or a paper cassette 225, for the transfer of a developed image on the photosensitive drum to the sheet. The magenta, cyan, yellow, and black toner images are transferred to the sheet in sequence, and the sheet is then ejected through a fixing unit 226.

Figure 20:
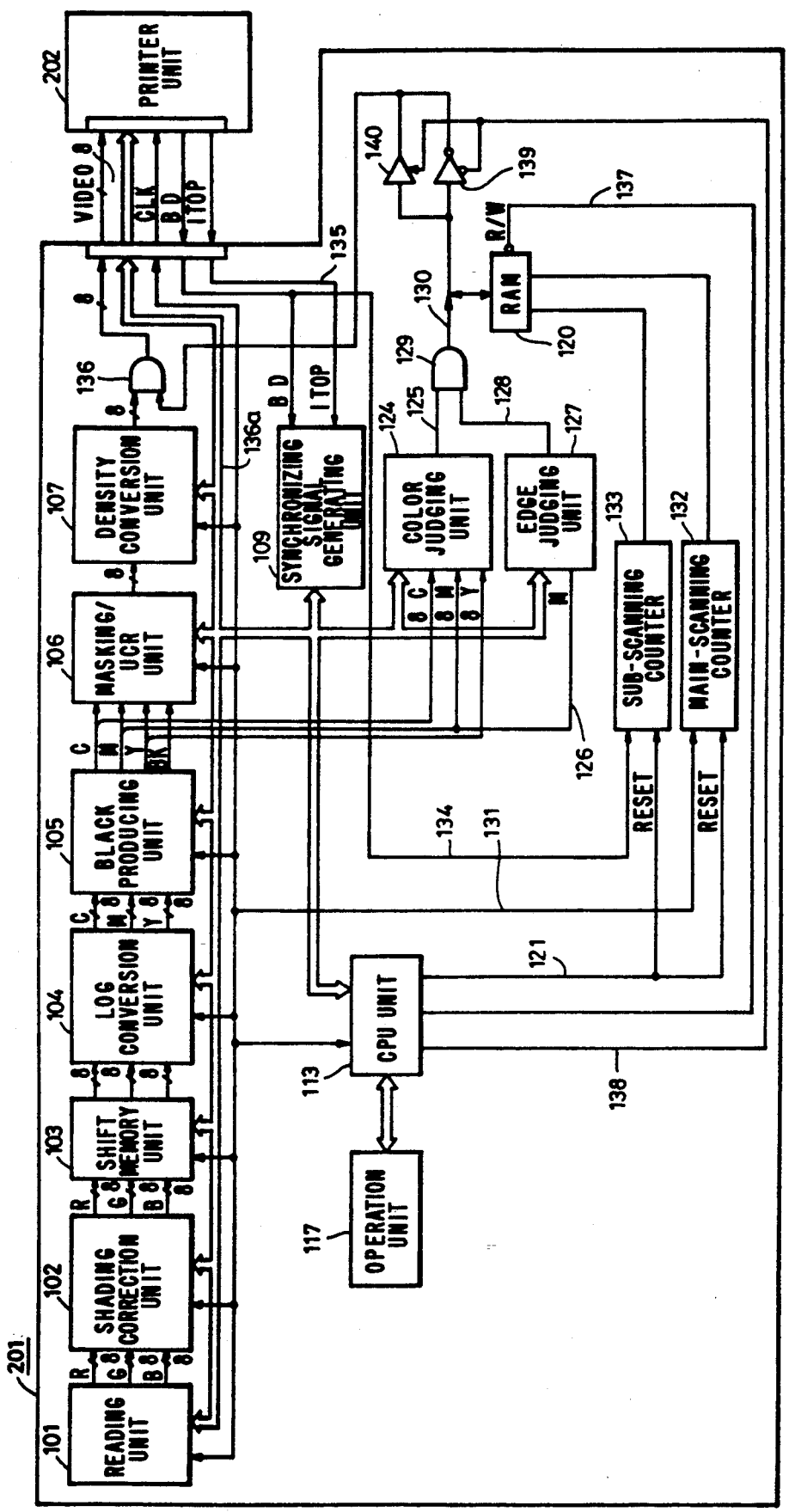
FIG. 20 is a block diagram for explaining the detailed structure of a signal processing unit shown in FIG. 19.
Figure 21A:
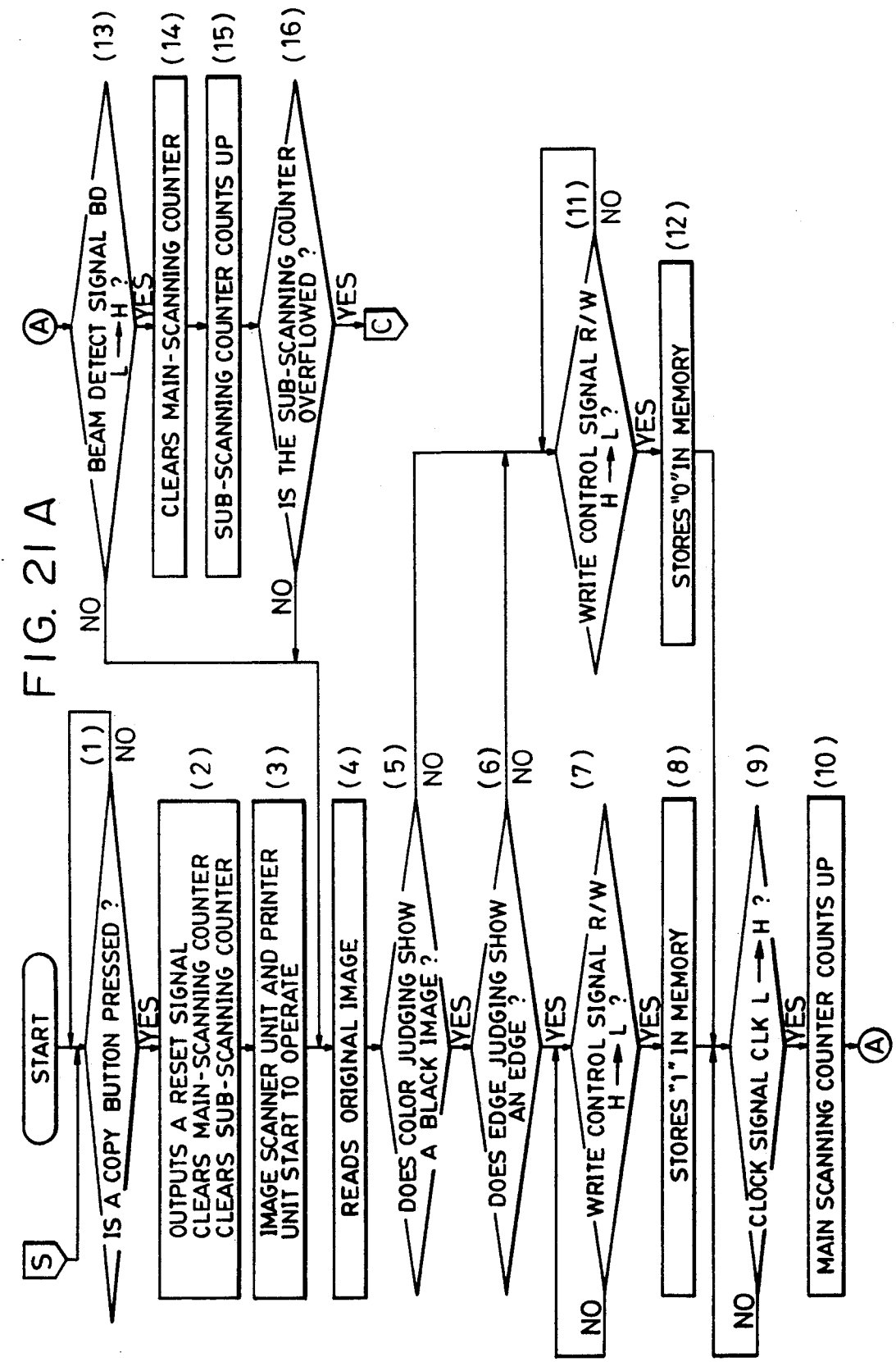

FIG. 20 is a block diagram for explaining the detailed structure of the signal processing unit 211 shown in FIG. 19.

A reading unit 101 includes a color sensor able to provide red (R), green (G), and blue (B) analog color signals independently, an amplifier for amplifying the analog color signals for each color, and an A/D converter for converting the analog color signals into 8 bit digital signals.

A shading correction unit 102 is provided for performing shading correction on the image signals for each color. A shift memory unit 103 is also provided for correcting lags between successive pixels of different color, and the signals are then shading-corrected by the shading correction unit 102. The corrected image signals output via the shift memory unit 103 are sent to a log conversion unit 104, which performs log correction for light-to-density conversion. Yellow (Y), magenta (M), and cyan (C) density signals output from the log conversion unit 104 are input to a black producing unit 105 to produce a black component signal (BK). The black component signal (BK) is produced based on MIN (Y, M, C), the instantaneous minimum of the three signals Y, M and C.

The yellow (Y), magenta (M), cyan (C), and black (BK) signals, which are outputs of the black producing unit 105, are processed by masking/UCR unit 106 for correcting for filter characteristics of the color sensor and for density characteristics of the colored toners. Then, the masking/UCR unit 106 performs undercolor removal, and selects one signal to be developed, from among the four color image signals Y, M, C, and BK. A density conversion unit 107 is provided for performing density conversion to be adapted to a developing characteristic of the printer unit 202 and the operator's preference. Then, a trimming processing unit (not shown) executes editing processing on the image signal, which has been density-converted by the density conversion unit 107, for an arbitrary section, and sends the processed image signal to the printer unit 202 to form a reproduced image.

A synchronizing signal generating unit 109 generates a horizontal synchronizing signal H SYNC, a pixel synchronizing signal CLK, and so forth, which are used in the image scanner unit 201, based on a horizontal synchronizing (beam detect) signal BD and a vertical synchronizing (image top) signal ITOP (135), each of which is sent via the printer unit 202, in order to send them to each processing unit and a CPU unit 113.

The CPU unit 113 includes a known I/O circuit, a timer circuit, an interruption control circuit, a serial communication circuit, a ROM, and a RAM in addition to a micro processor, and controls each processing unit. The CPU unit 113 controls a pulse motor for driving an optical system, the original illumination lamps 205, a sensor for detecting a position of the optical system, and an operation unit 117.

Explanation of black edge area processing will be given below with reference to FIGS. 21A through 21E.

FIGS. 21A through 21E are flow charts for explaining an example of black edge area processing procedure of the image processing apparatus. In FIGS. 21A through 21E, numerals (1)-(68) denote the various the various steps.

A RAM 120 shown in FIG. 20 has a memory capacity of 1,195,840 bits ((297×16)×(210×16)=1,195,840) because it stores an A4 size original (297 mm×210 mm) with a resolution of 16 pel/mm.

First of all, in step (1), the program stored in the CPU unit 113 stands by to wait for pressing of a copy button (not shown) on the operation unit 117. If the CPU unit 113 detects that the copy button is pressed, the CPU unit 113 outputs a reset signal 121 to make the values in a sub-scanning counter 133 and a main-scanning counter 132 "0" in step (2), and instructs the image scanner unit 201 and the printer unit 202 to initiate their operations involving a pre-scanning, in step (3).

In step (4), the reading unit 101 reads the red (R), green (G), and blue (B) image signals in synchronism with the pixel synchronizing signal CLK on the basis of the beam detect signal BD. The image signals thus obtained are input to a color judging unit 124, through the shading correction unit 102, the shift memory unit 103, the log conversion unit 104, and the black producing unit 105, to be used as the yellow (Y), magenta (M) and cyan (C) signals.

In step (5), the color judging unit 124 judges whether the difference between the maximum value and the minimum value from among the 8 bit yellow (Y), magenta (M), cyan (C) signals is less than "7" ("7" denotes a black image) or not. If it is, the color judging unit 124 outputs a black signal 125.

Meanwhile, the magenta (M) signal 126 is also input to an edge judging unit 127 incorporating a FIFO memory. In step (6), the edge judging unit 127 determines whether the value of an object pixel, i.e., the pixel currently of interest, is different from the values of pixels which immediately precede and immediately follow the object pixel in the main-scanning direction, and from the values of pixels which immediately precede and immediately follow the object pixel in the sub-scanning direction. If it is, i.e., the object pixel is an edge portion, the edge judging unit 127 outputs an edge signal 128, so that the edge signal 128 and the black signal 125 are input to an AND gate 129. Accordingly, in the case where a read pixel is a black image and an edge portion, only, a signal 130 is output from the AND gate 129.

In step (7), it is checked whether a write control signal R/W (137) has changed to L (low) level. If it has, the flow advances to step (8), where "1" is stored in an address "00000H" (H indicates a hexadecimal number) of a RAM 120. Since, in step (9) and (10), the main-scanning counter 132 counts up in synchronism with a clock signal 131, the signals 130 output from the AND gate 129 are stored in an address "1290H" of the RAM 120 in sequence.

On the other hand, when in step (5) or (6) the answer is no, "0" is stored in the address "000000H" in step (12) at a time when the write control signal R/W (137) is changed to L (low) level in step (11), and the flow returns to step (9).

The main-scanning counter 132 is cleared in step (14) whenever the beam detect signal BD (134) has changed from L (low) level to H (high) level in step (13). Further, the sub-scanning counter 133 counts up in synchronism with the beam detect signal BD in step (15) In this way, every part which is a black image and an edge portion, in the whole original of A4 size should be stored in the RAM 120.

In step (16), it is checked whether the sub-scanning counter 133 has overflowed or not. If it has not, the flow returns to step (4). If it has, the flow advances to an image reproduction mode, whereby the first original scanning after the pre-scanning is performed. At this time, the CPU unit 113 makes a change signal 138 L (low) level in step (17), and clears the outputs of the sub-scanning counter 133 and the main-scanning counter 132, "0" by outputting a reset signal 121, in step (18). Then, in step (19), the CPU unit 113 makes the write control signal R/W (137) H (high) level.

In step (20), the first image signals are sent from the reading unit 101 in synchronism with the pixel synchronizing signal CLK on the basis of the beam detect signal BD and the image top signal ITOP. The first image signals are input to the masking/UCR unit 106, through the shading correction unit 102, the shift memory unit 103, the log conversion unit 104, and the black producing unit 105 in sequence, to be used as the yellow (Y), magenta (M), cyan (C), and black (BK) signals.

At this time, the CPU unit 113 instructs the masking/UCR unit 106 through a bus 136a to output a cyan (C') signal, which is masking/UCR processed. The density conversion unit 107 performs density correction on the cyan (C') signal to be adapted to the toner, and outputs a converted cyan (C') signal. Further, data which is stored at the pre-scanning operation ("DATA" in the figure), is read out from the RAM 120 since the sub-scanning counter 133 and the main-scanning counter 132 both show "000000H" and the write control signal R/W (137) is H (high) level. The signal thus read out from the RAM 120 is input to an AND gate 136 after being inverted by an inverter 139 because the CPU unit 113 makes the change signal 138 L (low) level (in the case where the yellow (Y), magenta (M), or cyan (C) images are reproduced, the change signal 138 should be L (low) level, and in the case where the black (BK) image is reproduced, the change signal 138 should be H (high) level).

In step (21), if "1", which is obtained when the image signals are judged as a black edge portion at the pre-scanning operation, is stored in the address "000000H" of the RAM 120, the flow advances to step (22), where sending a video signal VIDEO to the printer unit 202 is prohibited because a L (low) level signal is input to the AND gate 136. On the other hand, if "0" is stored in the address "000000H" of the RAM 120 in step (21), the video signal VIDEO is sent to the printer unit 202 in step (23).

Then, when the pixel synchronizing signal CLK (131) is changed from L (low) level to H (high) level in step (24), the flow advances to step (25), where the main-scanning counter 132 counts up. Further, when the beam detect signal BD (134) is changed from L (low) level to H (high) level in step (26), the main-scanning counter 132 is cleared in step (27), and the sub-scanning counter 133 counts up in step (28).

In step (29), it is checked whether the sub-scanning counter 133 has overflowed or not. If it has not, the flow returns to step (20). When in step (29) the answer is yes, it means that the reproduction of the whole original image of A4 size, which is executed in synchronism with the pixel synchronizing signal CLK (131), using the cyan (C) toner, is complete.

Similarly, as shown in FIGS. 21C, 21D, and 21E, image reproduction processing for magenta (M), yellow (Y), and black (BK) are executed in steps (30) to (42), steps (43) to (55), and steps (56) to (68), respectively.

However, in the case where "1" is stored in the address "000000H" of the RAM 120 in step (60), the "1" data is input to the AND gate 136 through a non-inverter gate 140 because the CPU unit 113 makes the change signal 138 H (high) level in step (58). In this way, the output of the density conversion unit 107 is sent to the printer unit 202 just as it is. That is, an image, which is judged as a black edge portion at the pre-scanning operation, should be reproduced with only a black toner without being fixed any color toners, so that a black image which is not color-blurred can be reproduced with other developed color images.

In the above-described embodiment, explanation of black color edge processing in the case of a real-size copying is given. However, it should be understood that the invention can be applied to enlargement image processing. Enlargement copying processing of a digital color image reading apparatus is different from that of an analog color image reading apparatus which enlarges an image with a zoom lens to read it. That is, in the case where an enlargement in the main-scanning direction is executed, one read pixel is written plural times, e.g., four times in the case of 400% enlargement. Meanwhile, in the case where 400% enlargement in the sub scanning direction is executed, the sub-scanning speed of a reader should be set to one-fourth that of a real-size reading while the speed of a printer is set to the same with that of a real-size copying. Therefore, in the case where a stepping motor is used as a power source for the sub-scanning, the following situation often happens because of a vibration peculiar to stepping motors driven at low speed. That is, when compared with a real-size copying, the same point on an original cannot be read as the same point in such enlargement copying. Accordingly, the speed of the pre-scanning operation in an enlargement copying should be the same as the speed of the real-size copying to store the black edge portion. Then, when 400% enlargement copying is carried out, the sub-scanning counter 133 should count up for every four inputs of the beam detect signal BD (134), whereby an enlarged image, which is sharper than a real-size reproduced image, can be reproduced.

Further, when 400% enlargement copying is carried out, the sub-scanning counter 133 can count up with a frequency four times higher than that of the beam detect signal BD (134), to store the black edge portion. Then, the black edge portion can be read out while the sub-scanning counter 133 counts up with the beam detect signal BD (134), whereby it is possible to retrain the reproduction of a step-shaped slanting line, which used to be generated in the case of enlargement copying.

In the above-mentioned embodiment, information for the black edge portion is stored in the RAM 120 as binary data "1" or "0". However, if the memory capacity of the RAM 120 is expanded in such a way that it can store multi-level image data, the pre-scanning operation can be omitted. Further, if the apparatus is controlled in such a way that reproduction image information for the black toner is structured while judging the black edge portion, the number of scannings for one color original should be four, whereby a color image having a sharp black image can be reproduced with high speed.

In the last-described embodiment, the memory stores a black character portion and holds it until the next original reading. However, the memory can store a predetermined color portion, e.g., either the red or blue portion, which is not black portion, if the blur of that predetermined color portion is a problem.

As mentioned above, according to the present invention, the reproduction state of a black image can be made stable, whereby color reproduction characteristic of a printer can be stabilized.

Although the preferred particular embodiments of the present invention are disclosed herein for purposes of explanation, various modifications thereof, after study of this specification, will be apparent to those skilled in the art to which the invention pertains.

What is claimed is:

1. An image processing apparatus comprising:
   input means for inputting an image signal representing an original;
   image discrimination means for discriminating a characteristic of the image signal input by said input means for each block of a predetermined size and providing a discrimination signal representing the characteristic of the image signal;
   a memory for storing the discrimination signal of each said block for at least one picture of the original provided by said image discrimination means; and
   processing means for processing the image signal input by said input means in accordance with the discrimination signal of each said block stored in said memory to reproduce an image.

2. An image processing apparatus according to claim 1, wherein said memory stores the discrimination signal in accordance with a designated magnification.

3. An image processing apparatus according to claim 1, wherein said input means further comprises scanning means for scanning an original and providing the image signal, and wherein said memory stores the discrimination signal when said scanning means executes a first original scanning.

4. An image processing apparatus according to claim 3, wherein said scanning means executes a second original scanning after the first original scanning to provide a reentered image signal, and wherein said processing means processes the reentered image signal when said scanning means executes the second original scanning.

5. An image processing apparatus according to claim 1, wherein a resolution of said memory is lower than that of the image signal input by said input means.

6. An image processing apparatus comprising:
   input means for inputting an image signal;
   image discrimination means for discriminating a characteristic of the image signal input by said input means and providing a discrimination signal representing the characteristic of the image signal;
   designation means for designating an image area to be discriminated by said image discrimination means;
   a memory for storing the discrimination signal within the image area designated by said designation means; and
   changing means for changing the resolution of the discrimination signal to be stored in said memory in accordance with a size of the image area designated by said designation means.

7. An image processing apparatus according to claim 6, further comprising processing means for processing a reentered image signal input by said input means in accordance with the discrimination signal stored in said memory to reproduce an image.

8. An image processing apparatus according to claim 7, wherein said input means further comprises scanning means for scanning an original having the image area and providing the image signal, and wherein said memory stores the discrimination signal when said scanning means executes a first original scanning.

9. An image processing apparatus according to claim 8, wherein said scanning means executes a second original scanning after the first original scanning to provide the reentered image signal, and wherein said processing means processes the reentered image signal when said scanning means executes the second original scanning.

10. An image processing apparatus comprising:
  input means for inputting an image signal representing an original;
  extraction means for extracting an edge portion from the image signal input by said input means and providing an extraction signal;
  a memory for storing the extraction signal of at least one picture of the original provided by said extraction means; and
  processing means for processing the signal input by said input means in accordance with the extraction signal stored in said memory to reproduce an image.

11. An image processing apparatus according to claim 10, wherein said input means inputs color image signals, wherein said edge portion corresponds to a predetermined color.

12. An image processing apparatus according to claim 11, wherein said edge portion corresponds to a black character portion.

13. An image processing apparatus according to claim 11, further comprising printing means for printing an image in accordance with a reentered image signal processed by said processing means, and prohibiting means for prohibiting the reentered image signal not corresponding to the predetermined color from being sent to said printing means in the case where the extraction signal output from said memory does not represent the predetermined color.

14. An image processing apparatus according to claim 13, further comprising permitting means for permitting the reentered image signal corresponding to the predetermined color to be send to said printing means in the case where the extraction signal output from said memory represents the predetermined color.

15. An image processing apparatus comprising:
  input means for inputting an image signal representing an original;
  generating means for generating first and second color component signals in accordance with the image signal input by said input means;
  image discrimination means for discriminating a characteristic of the image signal input by said input means and providing a discrimination signal representing the characteristic of the image signal;
  a memory for storing the discrimination signal of at least one picture of the original provided by said image discrimination means; and
  processing means for processing the first and second color component signals in accordance with the discrimination signal stored in said memory to reproduce an image.

16. An image processing apparatus according to claim 15, wherein said generating means generates the first and second color component signals frame-sequentially.

17. An image processing apparatus according to claim 15, wherein the discrimination signals stored in said memory are read-out a plurality of times for the first and second color component signals.

* * * * *

UNITED STATES PATENT AND TRADEMARK OFFICE
CERTIFICATE OF CORRECTION

PATENT NO. : 5,189,523　　　　　　　　　　　　Page 1 of 2

DATED : Feb. 23, 1993

INVENTOR(S) : Takashi Sugiura, et al

It is certified that error appears in the above-identified patent and that said Letters Patent is hereby corrected as shown below:

COVER PAGE
　　At [54], "IMAGE PROCESSING APPARATUS" should read --IMAGE REPRODUCING APPARATUS WITH PROCESSING OF AN IMAGE SIGNAL DONE IN ACCORDANCE WITH A STORED DISCRIMINATION SIGNAL STORED CORRESPONDING TO A CHARACTERISTIC OF A BLOCK AREA OF AN ORIGINAL IMAGE--.
On drawing sheet:
SHEET 3
　　Fig. 3, "MAGNIFECATION" should read --MAGNIFICATION--.

COLUMN 1
　　line 2, "IMAGE PROCESSING APPARATUS" should read --IMAGE REPRODUCING APPARATUS WITH PROCESSING OF AN IMAGE SIGNAL DONE IN ACCORDANCE WITH A STORED DISCRIMINATION SIGNAL STORED CORRESPONDING TO A CHARACTERISTIC OF A BLOCK AREA OF AN ORIGINAL IMAGE--.

COLUMN 5
line 60, "t" should read --operation unit--

COLUMN 6
　　line 10, "3.15" should read --3-15--.
　　line 53, "Writes" should read --writes--.

COLUMN 7
　　line 33, "for and" should read --for information output from the edge extracting unit 3-9 and--.
　　line 34, "That is" should read --That is,--.
　　line 38, "unit 39" should read --unit 3-9--.

COLUMN 12
　　line 24, "unit:" should read --unit--.

UNITED STATES PATENT AND TRADEMARK OFFICE
CERTIFICATE OF CORRECTION

PATENT NO. : 5,189,523

DATED : Feb. 23, 1993

INVENTOR(S) : Takashi Sugiura, et al

It is certified that error appears in the above-indentified patent and that said Letters Patent is hereby corrected as shown below:

COLUMN 16
    line 63, "the" (second occurrence) should be deleted.
    line 64, "various" should be deleted--.

COLUMN 17
    line 43, "OOOOOH" should read --OOOOOOH--.

COLUMN 19
    line 35, "image;" should read --image--.

COLUMN 22
    line 4, "send" should read --sent--.

Signed and Sealed this

Third Day of May, 1994

Attest:

BRUCE LEHMAN

Attesting Officer     Commissioner of Patents and Trademarks